United States Patent
Jeong et al.

(10) Patent No.: US 11,922,723 B2
(45) Date of Patent: Mar. 5, 2024

(54) MOUTH SHAPE SYNTHESIS DEVICE AND METHOD USING ARTIFICIAL NEURAL NETWORK

(71) Applicant: LIONROCKET INC., Seoul (KR)

(72) Inventors: Seung Hwan Jeong, Seongnam-si (KR); Hyung Jun Moon, Seoul (KR); Jun Hyung Park, Seoul (KR)

(73) Assignee: LIONROCKET INC., Seoul (KR)

( * ) Notice: Subject to any disclaimer, the term of this patent is extended or adjusted under 35 U.S.C. 154(b) by 353 days.

(21) Appl. No.: 17/469,464

(22) Filed: Sep. 8, 2021

(65) Prior Publication Data

US 2022/0207262 A1 Jun. 30, 2022

(30) Foreign Application Priority Data

Dec. 30, 2020 (KR) .................. 10-2020-0188204

(51) Int. Cl.
   G06V 40/16 (2022.01)
   G06F 18/22 (2023.01)
   G06N 3/04 (2023.01)

(52) U.S. Cl.
   CPC ............ G06V 40/171 (2022.01); G06F 18/22 (2023.01); G06N 3/04 (2013.01); G06V 40/161 (2022.01); G06V 40/172 (2022.01); G06V 40/176 (2022.01)

(58) Field of Classification Search
   CPC .. G06V 40/171; G06V 40/172; G06V 40/161; G06V 40/176; G06F 18/22; G06N 3/04
   See application file for complete search history.

(56) References Cited

U.S. PATENT DOCUMENTS

| | | | | |
|---|---|---|---|---|
| 9,799,140 | B2* | 10/2017 | Hwang | G06V 40/168 |
| 10,573,349 | B2* | 2/2020 | De la Torre | G06V 10/761 |
| 11,010,944 | B2* | 5/2021 | De la Torre | G06T 11/00 |
| 2019/0206101 | A1* | 7/2019 | De la Torre | G06T 11/60 |

(Continued)

FOREIGN PATENT DOCUMENTS

| KR | 20190070065 | 6/2019 |
|---|---|---|
| KR | 20200094207 | 8/2020 |

OTHER PUBLICATIONS

Chugh, Komal, et al. "Not made for each other-audio-visual dissonance-based deepfake detection and localization." Proceedings of the 28th ACM international conference on multimedia. 2020. (Year: 2020).*

(Continued)

*Primary Examiner* — Utpal D Shah
(74) *Attorney, Agent, or Firm* — CANTOR COLBURN LLP

(57) ABSTRACT

Provided is a mouth shape synthesis device and a method using an artificial neural network. To this end, an original video encoder that encodes original video data which is a target of a mouth shape synthesis as a video including a face of a synthesis target; an audio encoder that encodes audio data that is a basis for the mouth shape synthesis and outputs an audio embedding vector; and a synthesized video decoder that uses the original video embedding vector and the audio embedding vector as input data, and outputs synthesized video data in which a mouth shape corresponding to the audio data is synthesized on the synthesis target face may be provided.

6 Claims, 24 Drawing Sheets

(56) References Cited

U.S. PATENT DOCUMENTS

| | | | | |
|---|---|---|---|---|
| 2021/0312915 | A1* | 10/2021 | Shaked | G10L 15/20 |
| 2021/0366173 | A1* | 11/2021 | Sinha | G06V 40/16 |
| 2022/0121868 | A1* | 4/2022 | Chen | G06V 40/171 |
| 2022/0138472 | A1* | 5/2022 | Mittal | G06N 3/045 |
| | | | | 382/181 |
| 2022/0375190 | A1* | 11/2022 | Chae | G06T 13/205 |
| 2023/0042654 | A1* | 2/2023 | Zhang | H04N 21/234336 |

OTHER PUBLICATIONS

Korean Office Action—Korean Application No. 10-2020-0188204 dated Feb. 16, 2021, citing KR 10-2020-0188200 and KR 10-2020-0188195.

* cited by examiner

MOUTH SHAPE SYNTHESIS DEVICE AND METHOD USING ARTIFICIAL NEURAL NETWORK

TECHNICAL FIELD

The present invention relates to a mouth shape synthesis device and a method using an artificial neural network.

BACKGROUND

Recently, with the improvement of an artificial neural network algorithm and computing power, the production and demand of contents which use artificial intelligence like a Deepfake have been very rapidly increased. The Deepfake is a technology in which Deep learning is used to generate processed content (synthesized video) different from an original by superimposing or combining other videos on the original image or video. According to Deeptrace (2019), The state of Deepfakes, Landscape, and Threats and Impact, it is known that the number of Deepfake contents increased from 7,964 in December 2018 to 14,678 in September 2019, and there are 20 Deepfake production communities and the number of users reaches 95,791. Moreover, mages using the Deepfake is considerably very much generated in the Youtube, Twitter, Reddit, or the like, and it is a situation in which the service creation using the Deepfake is progressed and serviced in a social content platform including TikTok, Snap, or the like. Moreover, when an application 'ZAO', which synthesizes a video including the movie, or the like with the face of the user, was released in September 2019, it took the first place in China's iOS App Store downloads. 'ZAO', which is known to have been invested by Chinese communication service Momo, is an application which allows the user to create a video in which he/she is a main character by pasting his/her face on a person in a movie or TV work, or video with just one picture of the frontal face of the user.

In the manufacture of the synthesis video using the artificial intelligence as in the above description, the Generative Adversarial Network (hereinafter, GAN) is most used. The GAN is a model in which a generation module and an identification module coexist and learn losses in an adversarial manner. These GAN-related studies are rapidly increasing to an extent from 3 cases in 2014, to 1,525 cases in 2019 and to 2,037 cases in current of 2020 at arXiv.

(Patent Literature 1) Korean Patent Unexamined Publication No. 10-2020-0094207, Systems and methods for generating personalized emoticons and lip synching videos based on facial recognition, Facebook, Inc.

(Patent Literature 2) Korean Patent Unexamined Publication No. 10-2019-0070065, Method and device for generating adaptive song lip sync animation based on text, CHUNG ANG University industry Academic Cooperation Foundation

SUMMARY OF INVENTION

Technical Problem

However, most of the existing artificial intelligence algorithms for generating synthesized videos are generalized models that synthesize new faces in existing videos, and it is difficult to find special models for special situations in which only a mouth shape is synthesized through an audio input. Accordingly, if the mouth shape synthesis through the audio input is performed by using the existing generalized synthesized video generation artificial intelligence model, there is a problem in that the audio and the video are not in sync or an inaccurate mouth shape is generated. Particularly, in a case of the mouth shape synthesis through the existing algorithm, there is a problem that in a transition section between a section in which there is an audio and a section in which there is no audio, a mouth shape with low reality is synthesized.

Therefore, an object of the present invention is to provide a mouth shape synthesis device and a method using an artificial neural network in which the precision of the synthesis of a mouth shape and a reality are improved through an audio input.

Solution to Problem

Hereinafter, concrete means for achieving the object of the present invention are explained.

The object of the present invention may be achieved by a mouth shape synthesis device using artificial neural network, including: an original video encoder that encodes original video data which is a target of a mouth shape synthesis as a video including a face of a synthesis target to output an original video embedding vector; an audio encoder that encodes audio data that is a basis for the mouth shape synthesis and outputs an audio embedding vector; a synthesized video decoder that uses the original video embedding vector and the audio embedding vector as input data, and outputs synthesized video data in which a mouth shape corresponding to the audio data is synthesized on the synthesis target face; a synthesized video discriminator that is an artificial neural network module which uses the synthesized video data as input data and uses a synthesized video discrimination vector, which distinguishes whether the synthesized video data is generated from the synthesized video decoder as output data, and outputs a synthesized video loss configured based on the synthesized video discrimination vector; an audio embedding module that is a pre-learned artificial neural network module which receives the audio data and outputs an audio sync vector; a synthesized video embedding module that is a pre-learned artificial neural network module that which receives the synthesized video data and outputs a synthesized video sync vector; and a sync discriminator that outputs a sync loss configured of a difference between the audio sync vector and the synthesized video sync vector. The audio embedding module and the synthesized video embedding module of the sync discriminator are pre-learned such that the higher a sync rate between mouth shapes of the audio data and the synthesized video data, the lower a sync loss is output. In a learning session of the original video encoder, the audio encoder, and the synthesized video decoder, the learning session is configured to be updated in a direction in which a sum of a reconstruction loss configured of a difference between the synthesized video data and the original video data, the synthesized video loss, the sync loss, and an emotion loss configured of a difference between the emotion vector and the labeled emotion state class is reduced.

In addition, the original video encoder is configured to output an emotion vector for distinguishing a plurality of emotion state classes together with the original video embedding vector as output data. The synthesized video discriminator is configured to output the emotion vector together with the synthesized video discrimination vector as output data. In a learning session of the original video encoder, the synthesized video decoder, and the synthesized video discriminator, the learning session is configured to be updated in a direction in which a sum of a reconstruction loss, the synthesized video loss, the sync loss, and an emotion loss configured of a difference between the emotion vector and the labeled emotion state class is reduced.

In addition, the mouth shape synthesis device further includes a face discriminator that is an artificial neural network module pre-trained to output a face discrimination vector for classifying a realistic face class when the synthesized video data is used as input data and a realistic face is included in the synthesized image data and an unrealistic face class when an unrealistic face is included in the synthesized image data, and outputs a face loss configured of a difference between the face discrimination vector and a labeled class. In the learning session of the original video encoder, the synthesized video decoder, and the synthesized video discriminator, the learning session is configured to be updated in a direction in which a sum of the reconstruction loss, the synthesized video loss, the sync loss, and the face loss is reduced.

In addition, the mouth shape synthesis device may include an audio mouth size embedding module that is a pre-learned artificial neural network module receiving the audio data and outputting an audio mouth size vector; and a video mouth size embedding module that is a pre-learned artificial neural network module receiving the synthesized video data and outputting a video mouth size embedding vector, and further includes a mouth size discriminator that outputs a mouth size loss configured of a difference between the audio mouth size embedding vector and the video mouth size embedding vector. The audio mouth size embedding module and the video mouth size embedding module of the mouth size discriminator are pre-learned such that the closer a distance between a mouth size feature of the audio data and a mouth size feature of the synthesized video data, the lower the mouth size loss is output. In the learning session of the original video encoder, the synthesized video decoder, and the synthesized video discriminator, the learning session is configured to be updated in a direction in which a sum of the reconstruction loss, the synthesized video loss, the sync loss, and the mouth size loss is reduced.

In addition, the mouth shape synthesis device may randomly apply nulling to a convolution filter to output a plurality of the synthesis sync vectors or the synthesized video sync vectors and calculate the sync loss based on an integrated vector obtained by integrating the plurality of output audio sync vectors or audio sync vectors.

Another object of the present invention may be achieved by a mouth shape synthesis device using artificial neural network, including: an original video encoder that encodes original video data which is a target of a mouth shape synthesis as a video including a face of a synthesis target to output an original video embedding vector; an audio encoder that encodes audio data that is a basis for the mouth shape synthesis and outputs an audio embedding vector; and a synthesized video decoder that uses the original video embedding vector and the audio embedding vector as input data, and outputs synthesized video data in which a mouth shape corresponding to the audio data is synthesized on the synthesis target face. In a learning session of the original video encoder, the learning session is configured to be updated in a direction in which a sum of a reconstruction loss configured of a difference between the synthesized video data and the original video data, the synthesized video loss, the sync loss, and an emotion loss configured of a difference between the emotion vector and the labeled emotion state class is reduced. The synthesized video loss is a loss output from a synthesized video discriminator, which is an artificial neural network module, using the synthesized video data as input data and using a synthesized video discrimination vector, which distinguishes whether the synthesized video data is generated from the synthesized video decoder, as output data, and means a loss configured based on the synthesized video discrimination vector. The sync loss is a loss output from the sync discriminator including an audio embedding module which is a pre-learned artificial neural network module that receives the audio data and outputs an audio sync vector; and a synthesized video embedding module which is a pre-learned artificial neural network module that receives the synthesized video data and outputs a synthesized video sync vector, and means a loss configured of a difference between the audio sync vector and the synthesized video sync vector. The audio embedding module and the synthesized video embedding module of the sync discriminator are pre-learned such that the higher a sync rate between mouth shapes of the audio data and the synthesized video data, the lower a sync loss is output.

Another object of the present invention may be achieved by a mouth shape synthesis method using a mouth shape synthesis device using an artificial neural network, the method including: an original video encoding step in which an original video encoder encodes original video data, which is a target of mouth shape synthesis, as a video including a synthesis target face, and outputs an original video embedding vector; an audio encoding step in which an audio encoder encodes audio data that is a basis for the mouth shape synthesis and outputs an audio embedding vector; and a synthesized video decoding step in which a synthesized video decoder uses the original video embedding vector and the audio embedding vector as input data, and outputs synthesized video data in which a mouth shape corresponding to the audio data is synthesized on the synthesized target face.

Advantageous Effects

As described above, according to the present invention, there is effects as follows.

First, according to an embodiment of the present invention, an effect is generated in which the sync precision of the video and audio is improved when the mouth shape is synthesized through the audio input.

Second, according to an embodiment of the present invention, an effect is generated in which the visual reality of the mouth shape synthesis through the audio input is improved. In a case of the mouth shape synthesis through the existing algorithm, there is a problem that the mouth shape with low reality is synthesized in a transition section between a section in which the audio is present and a section in which the audio is not present.

Third, according to an embodiment of the present invention, an effect is generated in which the synthesis of the face upper half and the face lower half is improved when the mouth shape is synthesized through the audio input.

Following drawings appended to this specification exemplify preferred embodiments of the present invention and serve to further understand the technical idea of the present invention together with the detailed description of the present invention, so that the present invention should not be construed as limited to the matters described in the drawings.

BRIEF DESCRIPTION OF THE DRAWINGS

Following drawings appended to this specification exemplify preferred embodiments of the present invention and serve to further understand the technical idea of the present invention together with the detailed description of the present invention, so that the present invention should not be construed as limited to the matters described in the drawings.

MODE OF DISCLOSURE

Figure 1A:
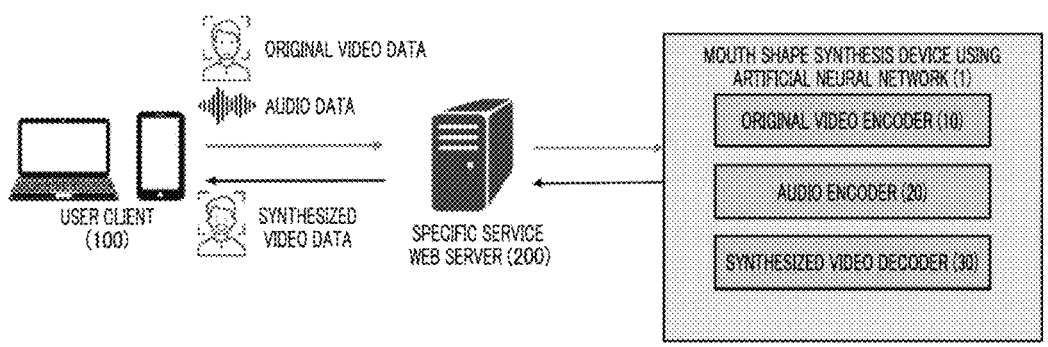
FIGS. 1A and 2E are schematic diagrams illustrating a using state of a mouth shape synthesis device 1 using an artificial neural network according to an embodiment of the present invention.

Hereinafter, embodiments in which those skilled in the art can easily practice the present invention will be described in detail with reference to the accompanying drawings. However, in the detailed description of an operating principle of the preferred embodiments of the present invention, in a case in which it is determined that a detailed description of a related known function or configuration may unnecessarily obscure the gist of the present invention, the detailed description thereof will be omitted.

In addition, the same reference numerals are used throughout the drawings for portions having similar functions and operations. Throughout the specification, when it is said that a specific portion is connected to another portion, this includes not only a case in which it is directly connected, but also a case in which it is indirectly connected with another element interposed therebetween. In addition, the inclusion of specific components does not exclude other components unless otherwise stated, but means that other components may be further included.

The scope of the present invention is not limited to Korean audio and video, and may include a range applied to various languages such as English, Japanese, and Chinese.

In addition, in the description of the present invention, the original video data may include a video format as well as an image format, and in a case in which the original video data is configured of the image format, a plurality of videos can be configured to be input as the original video data according to a preset number of frames.

Mouth Shape Synthesis Device Using Artificial Neural Network

Figure 1B:
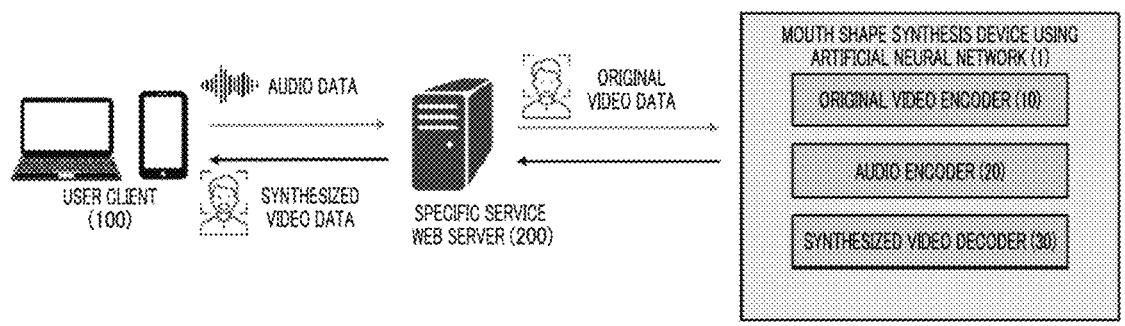
Figure 1C:
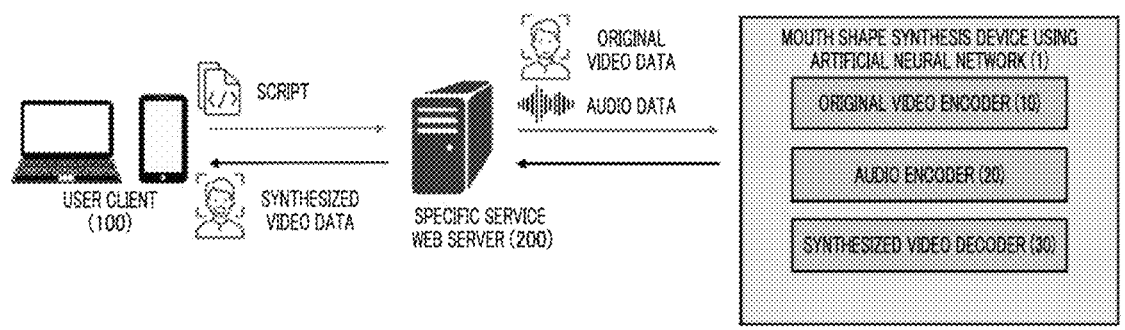
Figure 2D:
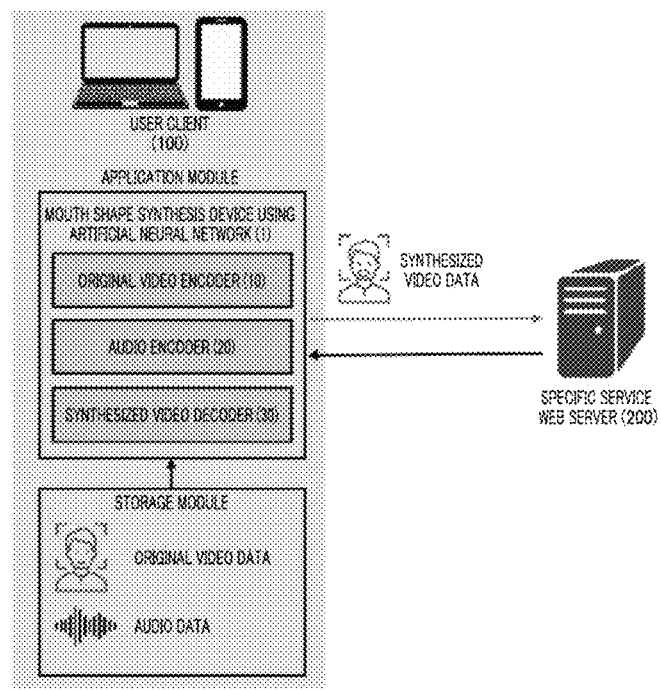
Figure 2E:
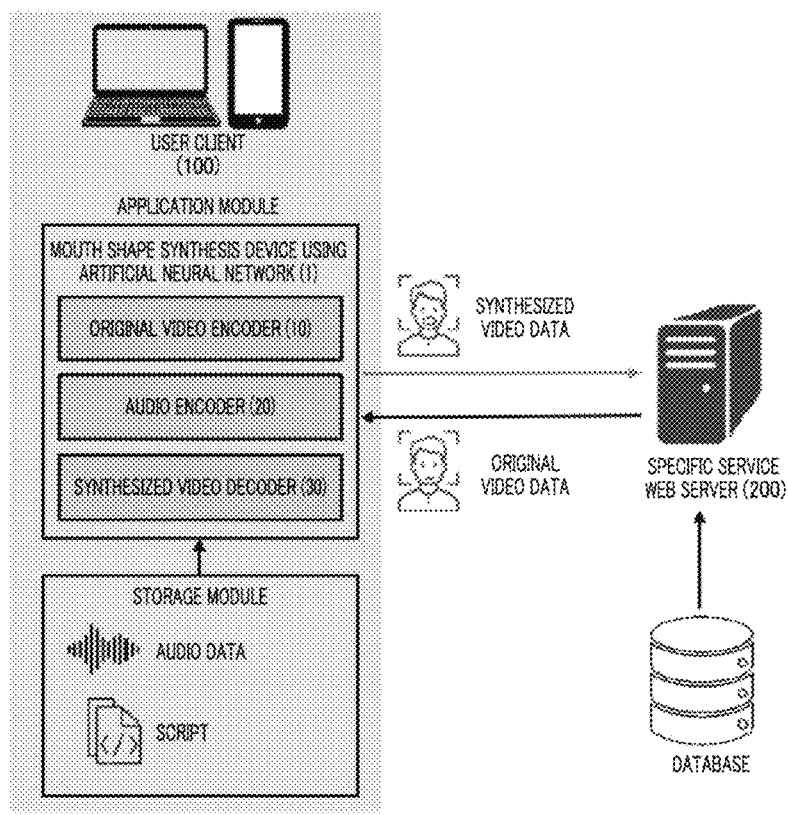

FIGS. 1 and 2 are schematic diagrams illustrating a using state of a mouth shape synthesis device 1 using an artificial neural network according to an embodiment of the present invention. As illustrated in FIGS. 1 and 2, the mouth shape synthesis device 1 using an artificial neural network according to an embodiment of the present invention may include all cases of being configured in a client or server serving as a terminal such as a laptop, a smart phone, or a desktop. In addition, original video data and audio data as input data may be received by a client or a server, and synthesized video data as output data may be configured to be transmitted to the client or the server.

Specifically, in a case in which the mouth shape synthesis device 1 using an artificial neural network is configured in the server, the server can be operated as illustrated in (a), (b), and (c) of FIG. 1. As illustrated in (a) of FIG. 1, the original video data and audio data in the user client 100 may be provided to the mouth shape synthesis device 1 using an artificial neural network through a specific service web server 200 that performs a specific app/web service. The mouth shape synthesis device 1 using an artificial neural network may be configured to generate synthesized video data and provide the video data to the specific service web server 200 and the user client 100. In addition, as illustrated in (b) of FIG. 1, the original video data may be provided from a database connected to the specific service web server 200 and provided to the mouth shape synthesis device 1 using an artificial neural network. In addition, as illustrated in (c) of FIG. 1, the user client 100 may provide only a script to the specific service web server 200, audio data may be generated based on the script in a Text to Speech (TTS), and provide it to the mouth shape synthesis device 1 using an artificial neural network. In addition, although not illustrated in the drawings, the original video data from the user client 100 may be provided to the mouth shape synthesis device 1 using an artificial neural network through the specific service web server 200 that performs the specific app/web service. The audio data may be provided from the database connected to the specific service web server 200 and provided to the mouth shape synthesis device 1 using an artificial neural network. The mouth shape synthesis device 1 using an artificial neural network may generate synthesized video data to provide it to the specific service web server 200 and the user client 100.

In addition, in a case in which the mouth shape synthesis device 1 using an artificial neural network is configured in the user client 100, it may operate as illustrated in (d) and (e) of FIG. 2. As illustrated in FIG. 2D, the mouth shape synthesizing device 1 using an artificial neural network may be configured in the application module configured in the user client 100, and the mouth shape synthesizing device 1 using an artificial neural network may receive original video data and audio data from the storage module of the user client 100 to generate the synthesized video data, and provide the generated synthesized video data to the specific service web server 200. Alternatively, as illustrated in (e) of FIG. 2, the original video data may be provided from the database connected to the specific service web server 200 and provided to the mouth shape synthesis device 1 using an artificial neural network. In addition, as illustrated in (e) of FIG. 2, the storage module of the user client 100 may provide only the script to the mouth shape synthesis device 1 using an artificial neural network in the application module, and TTS (Text to Speech) module in the application module may be configured to generate the audio data based on the corresponding script and provide the audio data to the mouth shape synthesis device 1 using an artificial neural network.

The scope of the present invention may include all cases in which the mouth shape synthesis device 1 using an artificial neural network is configured in the client or the server in addition to the above usage conditions, and the above usage conditions do not limit the scope of the present invention.

Figure 3A:
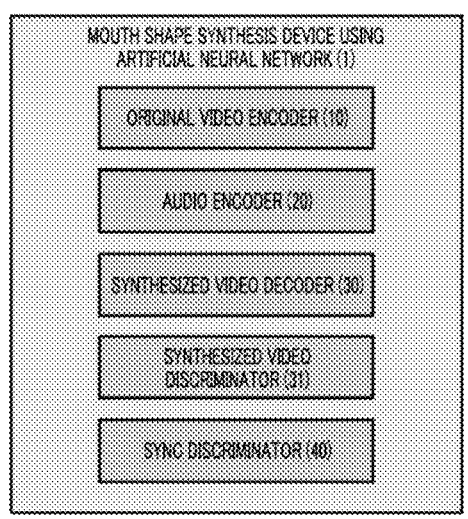
FIGS. 3A and 3B are a schematic diagram illustrating the mouth shape synthesis device using an artificial neural network according to an embodiment of the present invention.
Figure 3B:
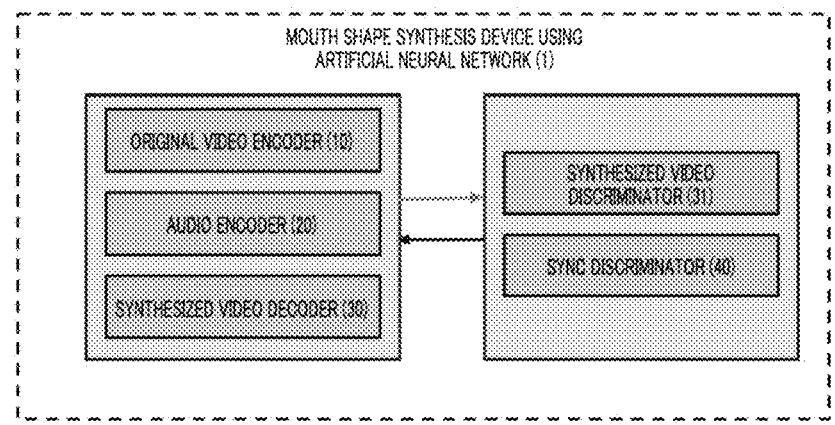
Figure 4:
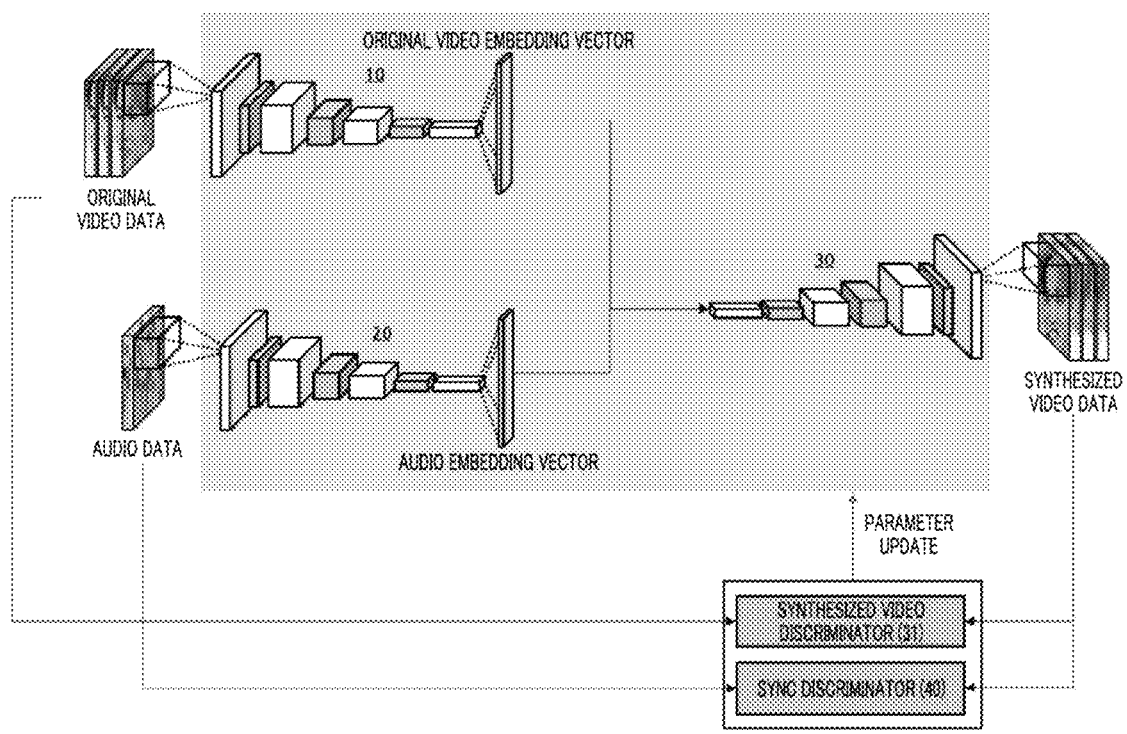
FIG. 4 is a schematic diagram illustrating a detailed structure of the mouth shape synthesis device 1 using an artificial neural network according to an embodiment of the present invention.

FIG. 3 is a schematic diagram illustrating the mouth shape synthesis device using an artificial neural network according to an embodiment of the present invention, and FIG. 4 is a schematic diagram illustrating a detailed structure of the mouth shape synthesis device 1 using an artificial neural network according to an embodiment of the present invention. As illustrated in FIGS. 3 and 4, the mouth shape synthesis device 1 using an artificial neural network according to an embodiment of the present invention may include an original video encoder 10, an audio encoder 20, a synthesized video decoder 30, a synthesized video discriminator 31, and a sync discriminator 40. In this case, the scope of the present invention may include a case in which [the original video encoder 10, the audio encoder 20, the synthesized video decoder 30, the synthesized video discriminator 31, and the sync discriminator 40] are configured in one computing system as illustrated in (a) of FIG. 3, and a case in which [the original video encoder 10, the audio encoder 20, and the synthesized video decoder 30] and [the synthesized video discriminator 31 and the sync discriminator 40] are configured in different computing systems, and connected to each other through wired/wireless networks as illustrated in (b) of FIG. 3. For example, the latter case may include a case in which [the original video encoder 10, the audio encoder 20, and the synthesized video decoder 30] are configured in the user client 100, and the [synthesized video discriminator 31 and the sync discriminator 40] are configured in the server end.

Figure 5:
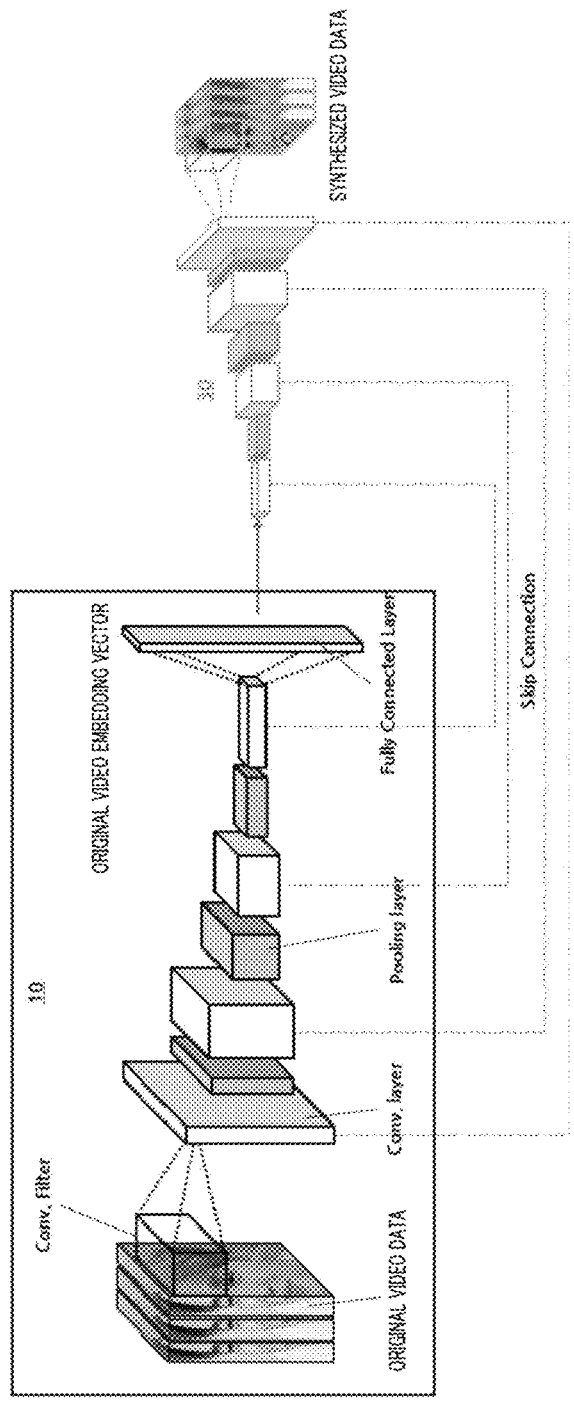
FIG. 5 is a schematic diagram illustrating a structure of an original video encoder 10 according to an embodiment of the present invention.

The original video encoder 10 is an encoding module that encodes the original video data that is the target of the mouth shape synthesis as a video including the face of the synthesis target and outputs an original video embedding vector of a specific dimension. FIG. 5 is a schematic diagram illustrating a structure of the original video encoder 10 according to an embodiment of the present invention. As illustrated in FIG. 5, for example, the original video encoder 10 according to an embodiment of the present invention may be configured of a ConvNet including a plurality of consecutive a Convolution Layer, a Pooling Layer, and a Fully Connected Layer, which receives a specific frame (original video data) of the original video standardized to a specific dimension as input data and encodes the original video embedding vector, which is a latent variable of 1×1×k, as output data. In addition, the original video encoder 10 may be configured of a skip connection structure with the synthesized video decoder 30.

In the learning session of the original video encoder 10, n arbitrary frames of the original video data input to the original video encoder 10 according to an embodiment of the present invention may be configured to be extracted from each frame of the original video to be input to each convolution layer of the original video encoder 10 and the synthesized video decoder 30 as a channel-wise concatenation structure. In a case in which sequential frames of the original video are used as the original video data, there is a problem that the original video data is already synchronized with the audio and the synchronized lip shape is included in the input data itself. According to the original video encoder 10 according to an embodiment of the present invention, this problem is solved, so that an effect of improving the learning performance of the synthesized video decoder 30 is generated compared to a case of using sequential frames of the original video. In addition, by the configuration in which n arbitrary frames are extracted and input to each convolution layer of the original video encoder 10 and the synthesized video decoder 30 as the channel-wise concatenation structure, Vanishing Gradient is improved in the learning session of the original video encoder 10 and the synthesized video decoder 30, Feature Propagation is strengthened, and the number of Parameters is saved, and thereby an effect of reducing computing resources is generated.

Figure 6:
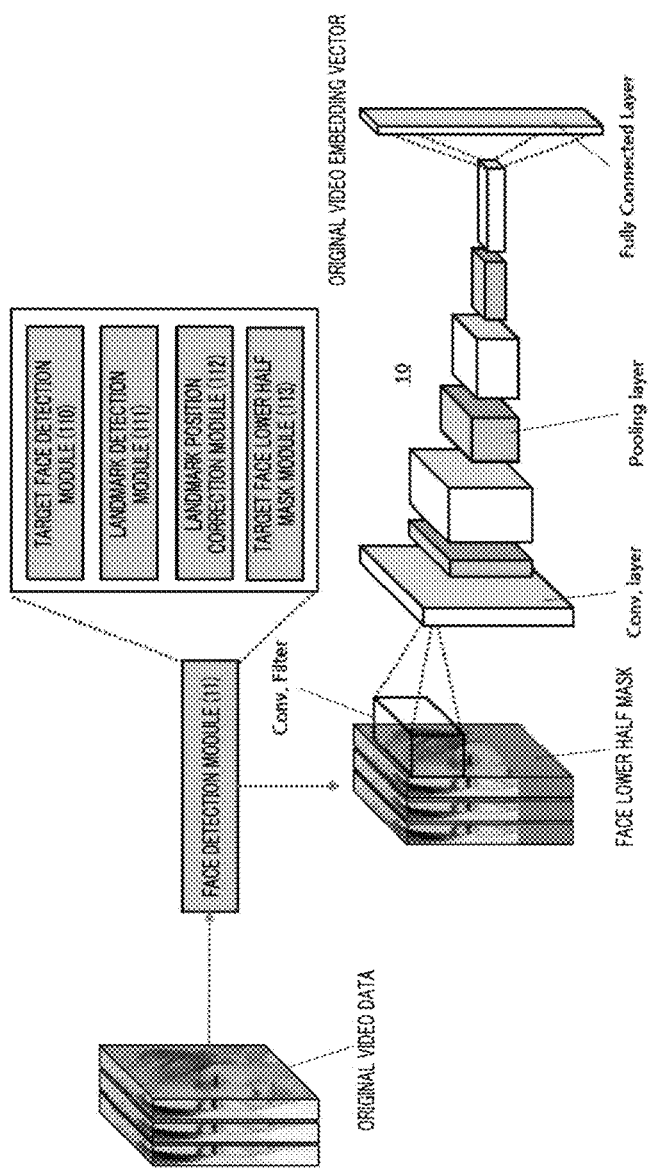
FIG. 6 is a schematic diagram illustrating an operational relationship between a face detection module 11 and an original video encoder 10.

In addition, according to an embodiment of the present invention, it may further include a face detection module 11 for generating original video data by masking a lower half of the face for each frame of the original video. The face detection module 11 according to an embodiment of the present invention is a module which extracts n arbitrary frames from each frame of the original video, detects the face (target face) that is the target of the mouth shape synthesis from the extracted frames, and then masks the lower half (for example, below the nose position or the mouth position) of the target face, and inputs the lower half of the target face from the original video to the original video encoder 10. FIG. 6 is a schematic diagram illustrating an operational relationship between the face detection module 11 and the original video encoder 10. As illustrated in FIG. 6, when the lower half of the target face is masked by the face detection module 11 according to an embodiment of the present invention and used as the input data of the original video encoder 10, an effect of minimizing an influence of the mouth shape of the synthetic video is generated. In this case, the face detection module 11 may be configured to include a previously disclosed Convolutional Network that forms a Bounding Box through Face detection to distinguish the upper and lower halves of the face based on the height of the Bounding Box, or include a previously disclosed Convolutional Network that outputs Confidence for the nose position/mouth position to distinguish the upper and lower halves of the face based on a specific nose position/mouth position.

With respect to the specific configuration of the face detection module 11, it may be configured to use the lower half of the detected Bounding Box as the lower half of the target face. The face detection module 11 for using the lower half of the more precisely target face may include a target face detection module 110, a landmark detection module 111, a landmark position correction module 112, and a target face lower half mask module 113. The target face detection module 110 may be configured as a Convolutional Neural Network using a specific frame of the original video as the input data and coordinates of a bounding box (target face bounding box) including the target face portion as the output data. The landmark detection module 111 is a module for outputting landmark position information and confidence information for defining the lower half of the target face, such as the nose or the mouth. The landmark position correction module 112 is a module that more precisely corrects the position information of the landmark by estimating a relationship between the landmarks detected by the landmark detection module 111. The target face lower half mask module 113 is a module that defines the lower half of the target face in the target face bounding box based on the landmark position information output from the landmark detection module 111 and corrected by the landmark position correction module 112.

With respect to a specific embodiment of the landmark detection module 111 and the landmark position correction module 112, the landmark detection module 111 uses a Feature Map (F) generated by the target face detection module 110 as an input value, and outputs a Detection Confidence Map (S) that predicts a Confidence value corresponding to a specific Label (for example, Nose and Mouth) for the landmark such as the nose or the mouth. An equation for the S output of the landmark detection module 111 in a first step is as follows.

$$S^1 = \rho^1(F) \qquad \text{Equation 1}$$

In Equation 1 above, S means a Detection Confidence Map output by the landmark detection module 111, and S1 means a Detection Confidence Map of the first stage. In addition, F means a Feature Map of the original video input to the landmark detection module 111 of the first stage. ρ1 means the inference of the ConvNet of the landmark detection module 111 of the first stage.

The landmark position correction module 112 uses F as the input value and outputs a set of relationship fields L that predict a relation vector (for example, a value corresponding to the closeness of each point to the landmark as a vector connecting point A and point B) for each landmark. An equation for the L output of the landmark position correction module 112 in the first step is as follows.

$$L^1 = \phi^1(F) \qquad \text{Equation 2}$$

In Equation 2 above, L means a relationship field including a plurality of relationship vectors output by the landmark position correction module 112, and L1 means the relationship field of the first step. In addition, F means a Feature Map of the original video input to the landmark detection module 111 of the first stage. φ1 means the inference of the ConvNet of the landmark position correction module 112 of the first stage.

S and L, which are predicted values output by the landmark detection module 111 and the landmark position correction module 112 in the first step, are input to the landmark detection module 111 and the landmark position correction module 112 after a second step together with F that is a Feature map which is firstly input, and are used to improve the accuracy of landmark detection and relationship prediction of each landmark as the following equation.

$$S^t = \rho^t(F, S^{t-1}, L^{t-1}), \forall t \geq 2 \qquad \text{Equation 3}$$

$$L^t = \phi^t(F, S^{t-1}, L^{t-1}), \forall t \geq 2 \qquad \text{Equation 4}$$

In Equation 3 above, S means a Detection Confidence Map output by the landmark detection module 111, St means a Detection Confidence Map of the t-th stage, and St-1 means a Detection Confidence Map of the first-stage, and Lt-1 means the relationship field of the first step. In addition, F means a FeatureMap of the original video input to the landmark detection module 111 of the first stage. ρt means the inference of the ConvNet of the landmark detection module 111 of the t-th step.

In Equation 4 above, L means a relationship field including a plurality of relationship vectors output by the landmark position correction module 112, Lt means a relationship field of the t-th step, and St-1 means the Detection Confidence Map of the first step, and Lt-1 means the relationship field of the first step. In addition, F means the FeatureMap of the original video input to the landmark detection module 111 of the first step. ot means the inference of the ConvNet of the landmark position correction module 112 of the t-th step.

According to an embodiment of the present invention, each Loss Function for each output value of the landmark detection module 111 and the landmark position correction module 112 of each step can be applied to improve the accuracy of landmark detection and prediction of the relation field, and can be learned to improve the accuracy of each of the landmark detection module 111 and the landmark position correction module 112 as the steps progress. According to an embodiment of the present invention, in a case in which the Loss Function is applied to each output value of the landmark detection module 111 and the landmark position correction module 112 of each step, the gradient is periodically supplemented, and thereby an effect of solving the vanishing gradient problem is generated.

Loss functions of the landmark detection module 111 and the landmark position correction module 112 may be configured as follows.

$$f_S^t = \sum_{j=1}^{J} \sum_p W(p) \cdot \|S_j^t(p) - S_j^*(p)\|_2^2 \quad \text{Equation 5}$$

$$f_L^t = \sum_{c=1}^{C} \sum_p W(p) \cdot \|L_c^t(p) - L_c^*(p)\|_2^2 \quad \text{Equation 6}$$

In Equations 5 and 6 above, fst means the Loss function in the t-th step of the landmark detection module 111, and fLt means the Loss function in the t-th step of the landmark position correction module 112. S of the landmark detection module 111 may be configured of a set of 1 to J and may be expressed as $S_j$. L of the landmark position correction module 112 may be configured of a set of 1 to C and may be expressed as $L_c$. * in each loss function means the Ground truth. That is, $S_j^*$ means the Ground truth of S, and $L_c^*$ means the Ground truth of the relation field L. p means a specific position, that is, a specific landmark. W means a binary mask, and may be configured to have a value of 1 in a case in which a label is present at a specific position p, and 0 in a case in which there is no label at the specific position p. In addition, $\|\cdot\|_2$ means $L_2$-norm. Such a binary mask has an effect of minimizing the disadvantage in the learning processing of the landmark detection module 111 and the landmark position correction module 112.

The audio encoder 20 is an encoding module that encodes the audio data that is a basis for the mouth shape synthesis as audio (synthesis-based audio) including a specific person's audio and outputs an audio embedding vector of a specific dimension. For example, the audio encoder 20 according to an embodiment of the present invention may be configured of ConvNet including a plurality of contiguous Convolution Layers that receive a mel spectrogram (audio data) of a synthesized basic audio standardized to a specific dimension as the input data, and encode the audio embedding vector which is a 1×1×k latent variable as the output data.

In the present invention, for convenience of explanation, the format of audio data is described as a Mel spectrogram which is a spectrogram of a Mel scale, but the scope of the present invention is not limited thereto, and may include formats such as rare audio signal, basic spectrogram without mel-filterbank, spectrum, frequency information using Fourier Transform, such as f0 which means Fundamental frequency, and aperiodicity which means a ratio between aperiodic components in a signal and an audio signal.

The synthesized video decoder 30 is a decoding module that uses a combined vector in which the original video embedding vector output from the original video encoder 10 and the audio embedding vector output from the audio encoder 20 are combined as the input data, and outputs synthetic video data that is a sequence of n specific frames in which the mouth shape corresponding to the audio data is synthesized to the target face that is the synthesis target. For example, the synthesized video decoder 30 according to an embodiment of the present invention may be configured of the ConvNet including a plurality of continuous Convolution layers that receive the combined vector in which the original video embedding vector and the audio embedding vector are combined as the input data, and decode the synthesized video data, which is the continuous n specific frames of height (h)×width (w)×3, as the output data. In the learning session of the synthesized video decoder 30, the original video encoder 10 and the synthesized video decoder 30 according to an embodiment of the present invention may apply the Skip Connection between the plurality of Convolution Layers.

In the learning session of the synthesized video decoder 30, the parameters of the synthesized video decoder 30 may be updated in a direction in which a reconstruction loss configured of a difference between the synthesized video data and the corresponding reference data (Ground Truth) is reduced. The reconstruction loss, which is one of loss functions of the synthesized video decoder 30, may be configured of a Mean square loss, a Cross entropy loss, and the like, and may be configured, for example, as follows.

$$L_c = \frac{1}{N} \sum_{i=1}^{N} \|L_g - L_G\|_2 \quad \text{Equation 7}$$

In the equation above, $L_c$ is the reconstruction loss, N is the number of pairs of synthesized video data and reference data (batch size), i is a specific frame pair among the pairs of N synthesized video data and reference data, and $L_g$ is the synthesized video data, $L_G$ is the reference data as Ground truth, and $\|\cdot\|_2$ may mean $L_2$-norm.

The synthesized video discriminator 31 is an artificial neural network module learned to receive the synthesized video data output from the synthesized video decoder 30, and output a synthesized video discrimination vector that distinguishes Real (original unsynthesized by the synthesized video decoder) and Fake (synthesis synthesized by the synthesized video decoder) of the synthesized video data. The synthesized video discriminator 31 according to an embodiment of the present invention may be configured to include a CONCAT function and a plurality of Convolution Layers.

In the learning session of the synthesized video discriminator 31, the learning session may be configured such that the original video data (Labeling with Real) and the synthesized video data (Labeling with Fake) output from the synthesized video decoder 30 are input to the synthesized video discriminator 31, the synthesized video discrimination vector (may be configured to include Real Class and Fake Class, or to include only Real Class) that distinguishes Real and Fake of the synthesized video data is output in the synthesized video discriminator 31, and the parameter of the ConvNet of the synthesized video discriminator 31 is updated in a direction in which the loss of the synthesized video including the difference between the actual Labels (Real or Fake) of the synthesized video discrimination vector and the input data is reduced.

That is, in the learning session of the synthesized video discriminator 31, the parameter of the synthesized video discriminator 31 may be updated such that the synthesized video discrimination vector $D_s(x)$ in the synthesized video data distribution is the minimum 0, and the synthesized video discrimination vector $D_s(x)$ in the original video data distribution, which is the corresponding reference data (Ground Truth) distribution, is the maximum 1. The synthesized video loss, which is the loss function of the synthesized video discriminator 31, may be configured, for example, as follows.

$$L_s = E_{x \sim L_G}[\log(D_s(x))] + E_{x \sim L_g}[\log(1 - D_s(x))] \quad \text{Equation 8}$$

In the equation above, $L_s$ means the synthesized video loss, $L_g$ means the synthesized video data, $L_G$ means the reference data as Ground truth, $x \sim L_G$ means the distribution of the reference data, $x \sim L_g$ means the distribution of the synthesized video data, and $D_s(x)$ means the synthesized video discrimination vector (a probability value between 0 and 1) output from the synthesized video discriminator 31.

With respect to the learning session of the synthesized video discriminator 31, the learning session of the synthesized video discriminator 31 may be configured such that the learning data labeled as synthesized and the learning data labeled as not synthesized into the synthesized video decoder 30 are configured as the learning data of the synthesized video discriminator 31, a specific frame segment of the learning data is input to the synthesized video discriminator 31 to output the synthesized video discrimination vector, the synthesized video loss of the learning data is calculated based on the synthesized video discrimination vector, and the parameter of the synthesized video discriminator 31 is updated in a direction in which the calculated synthesized video loss is minimized.

With respect to the operational relationship of the synthesized video discriminator 31, in a case in which it is determined that the synthesized video data output from the synthesized video decoder 30 is the synthesized video, the synthesized video loss may be learned to be output close to $D_s(x)=0$, $L_s=0$ (maximum value), and in a case in which it is determined that the synthesized video data is the original video, the synthesized video loss is output and the synthesized video data is determined to be the original video, the synthesized video loss may be learned to be output close to $D_s(x)=1$ and $L_s=-\infty$ (minimum value).

Figure 7:
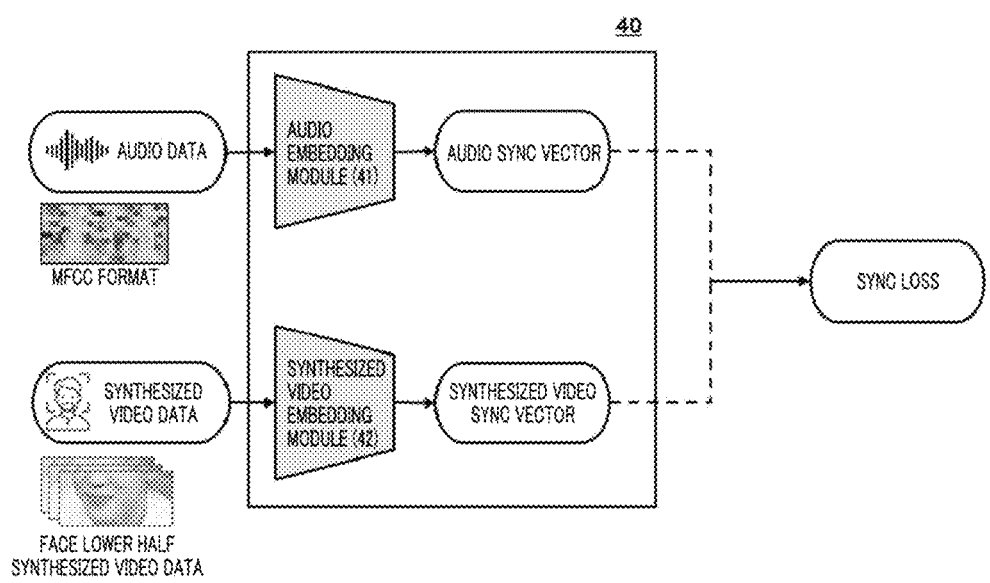
FIG. 7 is a schematic diagram illustrating a sync discriminator 40 according to an embodiment of the present invention.

With respect to the sync discriminator 40, FIG. 7 is a schematic diagram illustrating the sync discriminator 40 according to an embodiment of the present invention. As illustrated in FIG. 7, the sync discriminator 40 may be configured to include an audio embedding module 41 and a synthesized video embedding module 42.

The audio embedding module 41 may be configured of a pre-learned artificial neural network including a plurality of Convolution Layers that receive the audio data and output the audio sync vector. The synthesized video embedding module 42 may be configured of a pre-learned artificial neural network that receives the synthesized video data and outputs the synthesized video sync vector. In the learning session of the sync discriminator 40, the parameters of the audio embedding module 41 and the synthesized video embedding module 42 of the sync discriminator 40 may be updated in a direction in which the sync loss (the higher the synchro rate of synthesized video data and audio data is, the lower the sync loss is) is reduced. In this case, the audio embedding module 41 and the synthesized video embedding module 42 may include a plurality of Convolution layer (Conv.Layer), a Pooling layer, and a Fully connected layer. The audio sync vector and the synthesized video sync vector may mean vectors output from the specific Fully connected layer (FC Layer) or the Conv.Layer before the specific FC Layer.

The sync loss, which is the loss function of the sync discriminator 40, may be configured of a Mean square loss, a Cross entropy loss, or the like. For example, in a case in which a Binary cross entropy loss is applied, it may be configured as follows.

$$L_s = \frac{1}{N} \sum_{i=1}^{N} -\log\left(\frac{v_i \cdot s_i}{\|v_i\|_2 \cdot \|s_i\|_2}\right) \quad \text{Equation 9}$$

In the equation above, $L_s$ means the sync loss, N means the number of pairs of audio sync vector and synthesized video sync vector (batch size), i means a specific pair of N pairs of the audio sync vectors and the synthesized video sync vector, v means the synthesized video sync vector, s means the audio sync vector, and $\|\bullet\|_2$ may mean $L_2$-norm.

As a specific example of the input data, the audio data, which is the input data of the audio embedding module 41 of the sync discriminator 40, may be configured of a power spectrum at a nonlinear mel scale frequency of 13 (MFCC coefficient)×20 (audio frame)×1. The synthesized video data, which is the input data of the synthesized video embedding module 42 of the sync discriminator 40, may use only the lower half (below the nose or around the mouth) of the target face as the input data through the face detection module 11, and may be configured of video 5 frame of 120 (lower half height)×120 (width)×3 (RGB). Since the audio data is 20 audio frames at a sampling rate of 100 Hz, the audio data may be input to be configured of a section of 0.2 seconds, and the synthesized video data is 5 frames at a frame rate of 25 Hz, since the synthesized video data is 5 frames at a 25 Hz frame rate, the synthesized video data may be input to be configured of a section of 0.2 seconds.

As specific examples of the audio embedding module 41 and the synthesized video embedding module 42, it may be configured as follows.

| | | |
|---|---|---|
| = 0 | [55x55x96] | CONV1 : 96@ 11x11, stride = 4, parameter |
| | [27x27x96] | MAX POOL1 : 3x3, stride = 2 |
| = 2 | [27x27x256] | CONV2 : 256@ 5x5, stride = 1, parameter |
| | [13x13x256] | MAX POOL2 : 3x3, stride = 2 |
| = 1 | [13x13x384] | CONV3 : 384@ 3x3, stride = 1, parameter |
| = 1 | [13x13x384] | CONV4 : 384@ 3x3, stride = 1, parameter |
| = 1 | [13x13x256] | CONV5 : 256@ 3x3, stride = 1, parameter |
| | [6x6x256] | MAX POOL3 : 3x3, stride = 2 |
| | [4096] | FC6 : 4096 neurons |
| | [4096] | FC7 : 4096 neurons |

In the example above, CONV means Convolution Layer, MAX POOL means Pooling Layer, and FC means Fully Connected Layer.

With respect to the learning session of the sync discriminator 40, the learning session of the sync discriminator 40 may be configured such that the lower half video of the face of the specific frame segment of the learning video data for which the synchronization of the mouth shape and the audio is completed is input to the synthesized video embedding module 42 to output the learning video sync vector, the audio MFCC segment of the learning video data is input to the audio embedding module 41 to output the audio sync vector, and then the sync loss between the learning video sync vector and the audio sync vector is calculated, and the parameters of the audio embedding module 41 and the synthesized video embedding module 42 are updated in a direction in which the sync loss is minimized.

With respect to the operational relationship of the sync discriminator 40, the operational relationship may be configured such that the audio data and the synthesized video data are input to the sync discriminator 40, and the audio sync vector in the audio embedding module 41 and the synthesized video sync vector in the synthesized video embedding module 42 are respectively output, and the sync loss is calculated based on the output audio sync vector and the synthesized video sync vector.

According to the sync discriminator 40 of an embodiment of the present invention, the loss function with respect to the synchro rate for the audio and the synthesized video (particularly, the lower half) is further separately included, so that an effect of further improving the audio synchro rate for the mouth shape of the synthesized video that is generated by the synthesized video decoder 30 is generated. The loss functions used in the existing artificial neural networks for synthesizing the mouth shapes and the faces were all configured to focus on the visual similarity, so it was difficult to improve the audio synchro rate for the mouth shape of the synthesized video.

In addition, according to the sync discriminator 40 of an embodiment of the present invention, the learning session is processed separately from [the original video encoder 10, the audio encoder 20, the synthesized video decoder 30, and the synthesized video discriminator 31], and the sync discriminator 40 is configured in in a pre-learned state to provide the sync loss to the learning session of [the original video encoder 10, the audio encoder 20, and the synthesized video decoder 30]. Therefore, the degree of freedom of the neural network is improved without adding a significant amount of learning data or adding a significant amount of Computing Load, and thereby an effect of improving the video synthesis quality of the synthesized video decoder 30 is generated.

In the learning session of the original video encoder 10, the audio encoder 20, and the synthesized video decoder 30 in the mouth shape synthesis device 1 using an artificial neural network, the learning session may be configured such that the face of a specific person is included in the video, the specific video frame segment (original video data) of the learning data for which the synchronization of mouth shape and the audio is completed is input to the original video encoder 10 to output the original video embedding vector, the audio MFCC segment (audio data) of the learning data is input to the audio encoder 20 to output the audio embedding vector, and then the original video embedding vector and the audio embedding vector are input to the synthesized video decoder 30 to output synthesized video data. Thereafter, with respect to each Epoch, the learning session may be configured such that the parameters of the original video encoder 10, the audio encoder 20, the synthesized video decoder 30 are updated in a direction in which a sum of the reconstruction loss calculated based on the synthesized video data and the original video data, the sync loss calculated based on the synthesized video data and the audio data in the pre-learned sync discriminator 40, and the synthesized video loss (loss portion for the synthesized video data distribution) calculated based on the synthesized video discrimination vector of the synthesized video data in the pre-learned synthesized video discriminator 31 is reduced.

In the learning session of the synthesized video discriminator 31, the learning session may be configured such that the original video data (Labeling with Real) and the synthesized video data (Labeling with Fake) output from the synthesized video decoder 30 are input to the synthesized video discriminator 31, the synthesized video discrimination vector (may be configured to include Real Class and Fake Class, or include only Real Class) that distinguishes Real and Fake of the synthesized video data is output in the synthesized video discriminator 31, and the parameters of the ConvNet of the synthesized video discriminator are updated in a direction in which the loss including the difference between the synthesized video discrimination vector and the actual Label (Real or Fake) of the input data is reduced.

At this time, the original video encoder 10, the audio encoder 20, and the synthesized video decoder 30 may be configured to learn alternately with the synthesized video discriminator 31, or the original video encoder 10, the audio encoder 20, and the synthesized video decoder 30 may be configured to be learned together.

In an inference session of the mouth shape synthesis device 1 using an artificial neural network, only the original video encoder 10, the audio encoder 20, and the synthesized video decoder 30 can be operated. In an inference session of the original video encoder 10, the audio encoder 20, and the synthesized video decoder 30, the inference session may be configured such that the specific video frame segment (original video data) of the original video data including the target face in the video is input to the original video encoder 10 to output the original video embedding vector, the audio MFCC segment (audio data) to be synthesized into the original video data is input to the audio encoder 20 to output the audio embedding vector, and then the original video embedding vector and the audio embedding vector are input to the synthesized video decoder 30 to output synthesized video data.

According to the above configuration of the mouth shape synthesis device 1 using an artificial neural network according to an embodiment of the present invention, the effect of improving the sync accuracy of the audio and the video is generated when the mouth shape is synthesized through the audio input. In addition, by the organic combination of the face discriminator and the synthesized video discriminator, the effect of improving the visual realism of the mouth shape synthesis through the audio input is generated. In a case of the mouth shape synthesis through the existing algorithm, there was a problem in that a low realistic mouth shape was synthesized into a transition section between the section in which the audio exists and the section in which the audio does not exist.

Modified Examples

Figure 8:
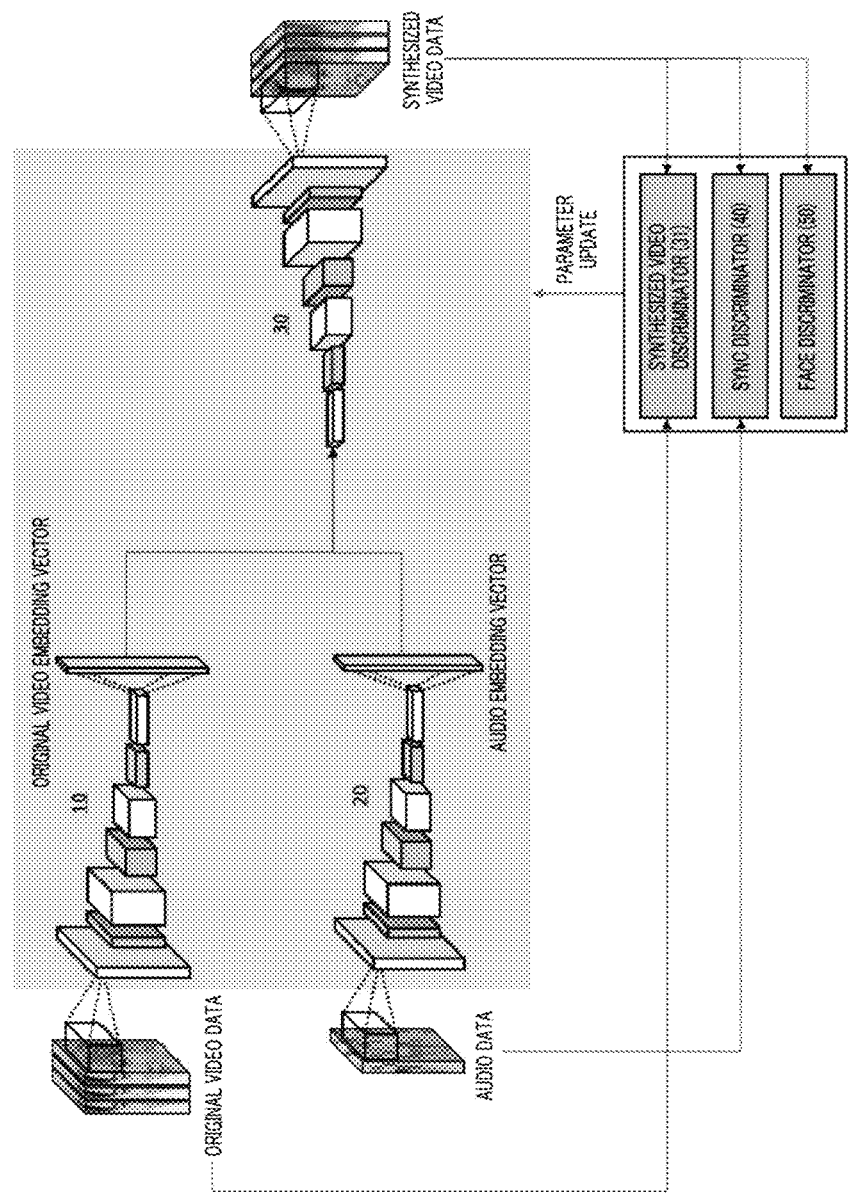
FIG. 8 is a schematic diagram illustrating a mouth shape synthesis device 1 using an artificial neural network which further includes a face discriminator 50 according to a modified example of the present invention.

With respect to the face discriminator 50, FIG. 8 is a schematic diagram illustrating a mouth shape synthesis device 1 using an artificial neural network which further includes a face discriminator 50 according to a modified example of the present invention. As illustrated in FIG. 8, the mouth shape synthesis device 1 using an artificial neural network according to the modified example of the present invention may further include the face discriminator 50.

The face discriminator 50 is a learned artificial neural network module so as to receive the synthesized video data output from the synthesized video decoder 30 and output the face discrimination vector (probability value between 0 and 1) that distinguishes the reality of the face of the synthesized video data. The face discriminator 50 according to an embodiment of the present invention may be configured to include a plurality of Convolution Layers, and may be configured such that the face discrimination vector $D_f(x)$ in the synthesized video data distribution is the minimum 0, the face discrimination vector $D_f(x)$ in the corresponding reference data (Ground Truth) distribution is the maximum 1, and the parameter of the face discriminator 50 is updated in the learning session of the face discriminator 50. The face loss, which is the loss function of the face discriminator 50, may be configured, for example, as follows.

$$L_f = E_{x \sim L_G}[\log(D_f(x))] + E_{x \sim L_g}[\log(1-D_f(x))]$$ Equation 10

In the equation above, $L_f$ means the face loss, $L_g$ means the synthesized video data, $L_G$ means the reference data as Ground truth, $x \sim L_G$ means the distribution of the reference data, $x \sim L_g$ means the distribution of the synthesized video data, and $D_f(x)$ means the face discrimination vector (probability value between 0 and 1) output from the face discriminator 50.

Figure 9:
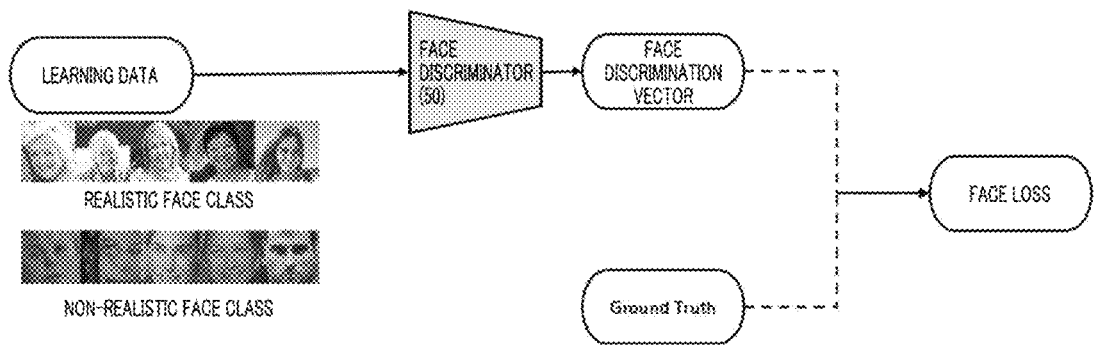
FIG. 9 is a schematic diagram illustrating a learning session of the face discriminator 50 according to the modified example of the present invention.

With respect to the learning session of the face discriminator 50, FIG. 9 is a schematic diagram illustrating the learning session of the face discriminator 50 according to the modified example of the present invention. As illustrated in FIG. 9, the learning session of the face discriminator 50 may be configured such that the learning data (realistic face Class) labeled as including a realistic face and the learning data (non-realistic face Class) labeled as not including a realistic face are configured as learning data of the face discriminator 50, the specific frame segment of the learning data is input to the face discriminator 50 to output the face discrimination vector, the face loss of the learning data is calculated based on the face discrimination vector and Ground Truth that is Label of the learning data, and the parameters of the face discriminator 50 is updated in a direction in which that the calculated face loss is minimized With respect to an operational relationship of the face discriminator 50, in a case in which the synthesized video data output from the synthesized video decoder 30 is close to the unrealistic face, the face loss is output, therefore, $D_f(x)=0$ and $L_f=0$ (maximum value), and in a case in which the synthesized video data is close to the realistic face, the face loss is output, therefore, $D_f(x)=1$ and $L_f=-\infty$ (minimum value).

With respect to the learning session of the mouth shape synthesis device 1 using an artificial neural network including the face discriminator 50 according to the modified example of the present invention, the learning session may be configured such that the face of the specific person is included in the video, the synchronization of the mouth shape and the audio is complete, the specific video frame segment (original video data) of the learning data labeled for each frame segment that includes the realistic face or does not include the realistic face is input to the original video encoder 10 to output the original video embedding vector, the audio MFCC segment (audio data) of the learning data is input to the audio encoder 20 to output the audio embedding vector, and then the original video embedding vector and the audio embedding vector are input to the synthesized video decoder 30 to output the synthesized video data. Thereafter, for each epoch, the learning session may be configured such that the parameters of the original video encoder 10, the audio encoder 20, and the synthesized video decoder 30 are updated in a direction in which a sum of the reconstruction loss calculated based on the synthesized video data and the original video data, the synthesized video loss of the pre-learned synthesized video discriminator 31, the sync loss calculated based on the synthesized video data and the audio data in the pre-learned sync discriminator 40, and the face loss calculated based on the face discrimination vector of the synthesized video data in the pre-learned face discriminator 50 is reduced.

According to this, compared to the loss function used in the existing artificial neural network that synthesizes the mouth shape or the face, as the face loss, which is a separate loss function for the visual quality, is added, an effect of improving the visual quality of the mouth shape synthesis of the generated synthesized video is generated compared to the existing artificial neural network.

Figure 10:
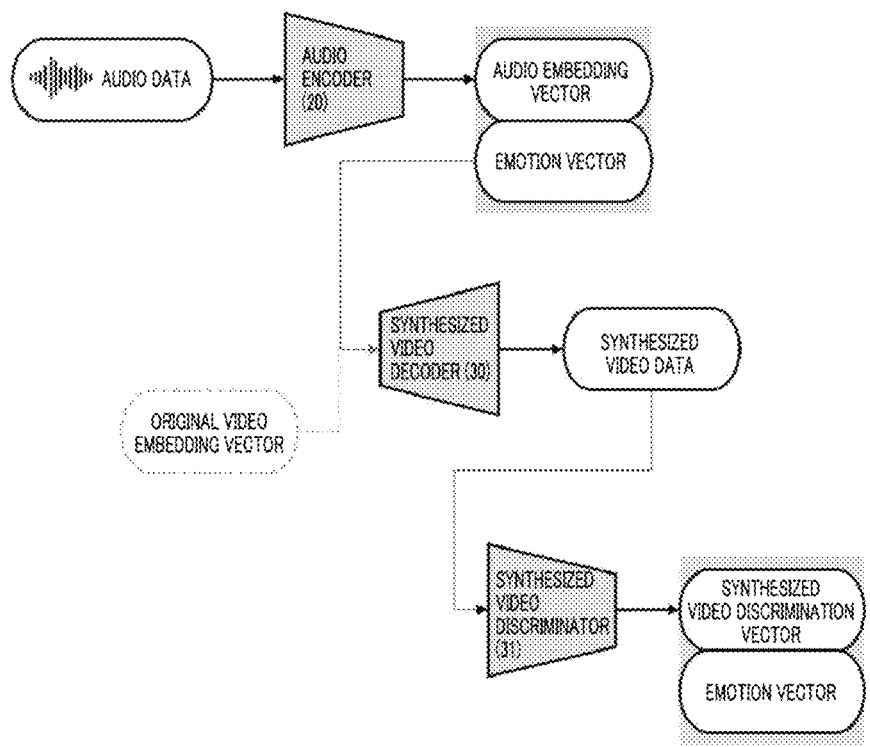
FIG. 10 is a schematic diagram illustrating a combination of an emotion vector according to a modified example of the present invention.

With respect to an emotion vector, FIG. 10 is a schematic diagram illustrating a combination of emotion vectors according to a modified example of the present invention. As illustrated in FIG. 10, the mouth shape synthesis device 1 using an artificial neural network according to another modified example of the present invention may be configured such that the audio embedding vector that is the output vector of the audio encoder 20 and the emotion vector that distinguishes a plurality of emotion state Classes are output together, and the synthesized video discrimination vector that is the output vector of the synthesized video discriminator 31 are output together. At this time, the synthesized video discrimination vector that is the output vector of the synthesized video discriminator 31 may be configured of one output by combining the emotion vectors, or may be configured such that the emotion vector and the synthesized video discrimination vector are output separately by configuring a separate activation function (Sigmoid, ReLU, or the like) that outputs the emotion vector to the Output Layer of the synthesized video discriminator 31. In addition, in the loss functions of the original video encoder 10, the audio encoder 20, the synthesized video decoder 30, and the synthesized video discriminator 31, the emotion loss configured based on a difference between the emotion vector and the emotion state Class which is actual labeled may be further included.

The emotion vector may be configured to include a plurality of emotion Classes, and for example, the confidence for each of a plurality of emotion states of [happiness, sadness, surprise, fear, no emotion, and the like] may be configured.

With respect to the learning session of the mouth shape synthesis device 1 using an artificial neural network according to the modified example of the present invention, the learning session may be configured such that the face of the specific person is included in the video, synchronization of the mouth shape and the audio is completed, the original video data, which is the video format of the learning data, is input to the original video encoder 10 to output the original video embedding vector, the audio MFCC segment (audio data) of the learning data, in which the emotion states ([happiness, sadness, surprise, fear, emotionlessness, and the like]) of the audio data are labeled for each frame segment, is input to the audio encoder 20 to output the audio embedding vector and the emotion vector ([a plurality of emotion state Classes such as happiness, sadness, surprise, fear, and emotionlessness]), and then the emotion vector, the original video embedding vector, and the audio embedding vector are input to the synthesized video decoder 30 to output synthesized video data. Thereafter, for each epoch, the learning session may be configured such that the parameters of the original video encoder 10, the audio encoder 20, and the synthesized video decoder 30 are updated in a direction in which a sum of the reconstruction loss calculated based on the synthesized video data and the original video data, the synthesized video loss in the pre-learned synthesized video discriminator 31, the sync loss, and emotion loss calculated based on the synthesized video data and the audio data in the pre-learned sync discriminator 40 is reduced. In addition, in the learning session of the synthesized video discriminator 31, the learning session may be configured such that the original video data (Labeling with Real) and the synthesized video data (Labeling with Fake) output from the synthesized video decoder 30 are input to the synthesized video discriminator 31, the synthesized video discrimination vector (may be configured to include Real Class and Fake Class, or include only Real Class) that distinguishes Real and Fake of synthetic video data, and emotion vector ([a plurality of emotion state Classes such as happiness, sadness, surprise, fear, and emotionlessness]) are output in the synthesized video discriminator 31, and the parameters of the synthesized video discriminator 31 are updated in a direction in which the loss including the difference between the synthesized video discrimination vector and the actual Label (Real or Fake) of the input data, and the difference between the emotion vector and the actual emotion state Label ([a plurality of emotion state Classes such as happiness, sadness, surprise, fear, and emotionlessness]) of input data is reduced.

In an inference session of the mouth shape synthesis device 1 using an artificial neural network further including the emotion vector according to the modified example of the present invention, only the original video encoder 10, the audio encoder 20, and the synthesized video decoder 30 are operated. In the inference session of the original video encoder 10, the audio encoder 20, and the synthesized video decoder 30, the inference session may be configured such that the specific video frame segment (original video data) of the original video data including the target face in the video is input to the original video encoder 10 to output the original video embedding vector, the audio MFCC segment (audio data) to be synthesized into the original video data is input to the audio encoder 20 to output the audio embedding vector and the emotion vector ([a plurality of emotion states such as happiness, sadness, surprise, fear, and emotionlessness]), and then the emotion vector, the original video embedding vector, and the audio embedding vector are input to the synthesized video decoder 30 to output the synthesized video data.

According to this, synchronization with the audio data of the mouth shape of the target face output from the synthesized video data is achieved, and at the same time, an effect that the mouth shape is synthesized according to the emotion state included in each segment of the audio data is generated. That is, since the mouth shape is synthesized according to the emotion state of the audio data, which is the basis of the synthesis, an effect is generated in which a more natural synthesized video can be generated from the viewpoint of the viewer of the synthesized video.

Figure 11:
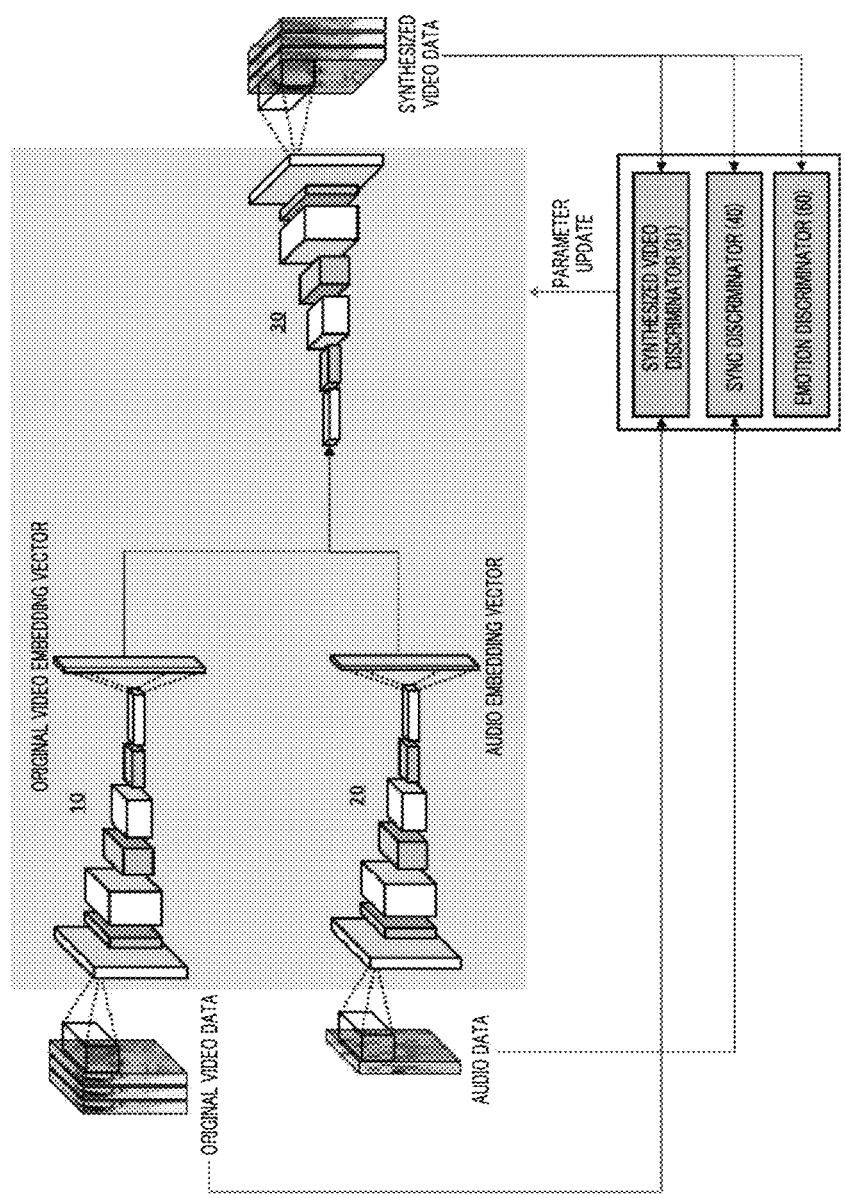
FIG. 11 is a schematic diagram illustrating a mouth shape synthesis device 1 using an artificial neural network which further includes an emotion discriminator 60 according to the modified example of the present invention.

With respect to the emotion discriminator 60, FIG. 11 is a schematic diagram illustrating a mouth shape synthesis device 1 using an artificial neural network further including an emotion discriminator 60 according to a modified example of the present invention. As illustrated in FIG. 11, the mouth shape synthesis device 1 using an artificial neural network according to another modified example of the present invention may further include the emotion discriminator 60 and an emotion loss.

The emotion discriminator 60 is a learned artificial neural network module that receives the synthesized video data output from the synthesized video decoder 30, and outputs the emotion vector ([a plurality of emotion state Classes such as happiness, sadness, surprise, fear, and emotionlessness]) that distinguishes the emotion state of the synthesized video data. The emotion discriminator 60 according to an embodiment of the present invention may be configured to include a plurality of Convolution Layers.

In the learning session of the emotion discriminator 60, the learning session may be configured such that the learning data in which the emotion state is labeled is input to the emotion discriminator 60 to output the emotion vector ([a plurality of emotion state Classes such as happiness, sadness, surprise, fear, and emotionlessness]) that distinguish the emotion state of the learning data, and the parameters of the emotion discriminator 60 are updated in a direction in which the emotion loss, which is a loss including the difference between the emotion vector and the actual emotion state Label of the input data, is reduced.

In the learning session of the mouth shape synthesis device 1 using an artificial neural network according to another modified example of the present invention, the learning session may be configured such that the face of the specific person is included in the video, the synchronization of the mouth shape and the audio is completed, the specific video frame segment (original video data) of the learning data, in which the emotion state ([happiness, sadness, surprise, fear, emotionlessness, or the like]) is labeled for each frame segment, is input to the original video encoder 10 to output the original video embedding vector, the audio MFCC segment (audio data) of the learning data is input to the audio encoder 20 to output the audio embedding vector, and then the original video embedding vector and the audio embedding vector are input to the synthesized video decoder 30 to output the synthesized video data. Thereafter, for each epoch, the learning session may be configured such that the parameters of the original video encoder 10, the audio encoder 20, and the synthesized video decoder 30 are updated in a direction in which a sum of the reconstruction loss calculated based on the synthesized video data and the original video data, the synthesized video loss in the pre-learned synthesized video discriminator 31, the sync loss calculated based on the synthesized video data and the audio data in the pre-learned sync discriminator 40, and the emotion loss calculated based on the emotion vector of the synthesized video data and the emotion state Label of the original video data in the pre-learned emotion discriminator 60 is reduced.

According to this, the synchronization with the audio data of the mouth shape of the target face output from the synthesized video data is achieved, and at the same time, the effect that the mouth shape is synthesized according to each emotion state of the target face is generated. That is, since the mouth shape is synthesized according to each emotion state of the target face, a more natural and seamless synthesized video can be generated. In addition, by separating the roles of the synthesized video discriminator 31 and the emotion discriminator 60, an effect is generated in which the accuracy of the synthesized video discriminator 31 is improved.

Figure 12:
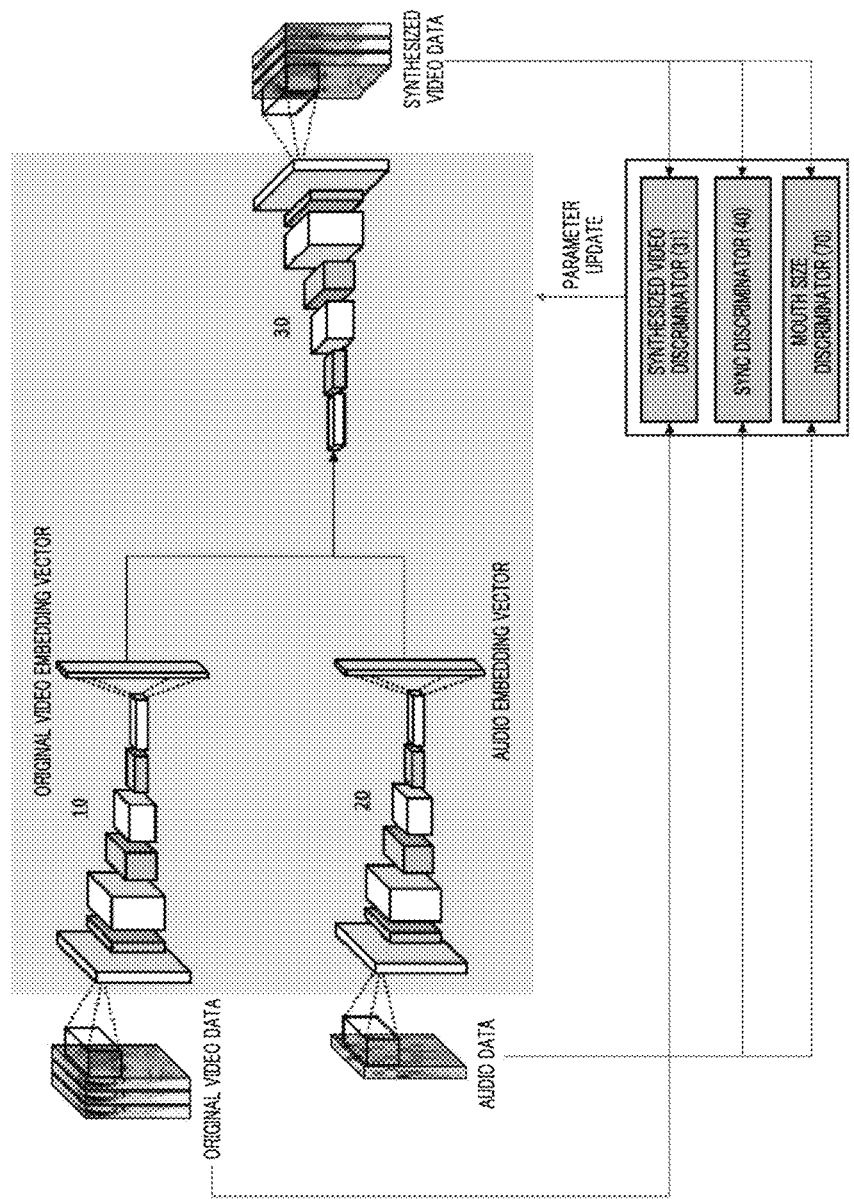
FIG. 12 is a schematic diagram illustrating a mouth shape synthesis device 1 using an artificial neural network which further includes a mouth size discriminator 70 according to a modified example of the present invention.
Figure 13:
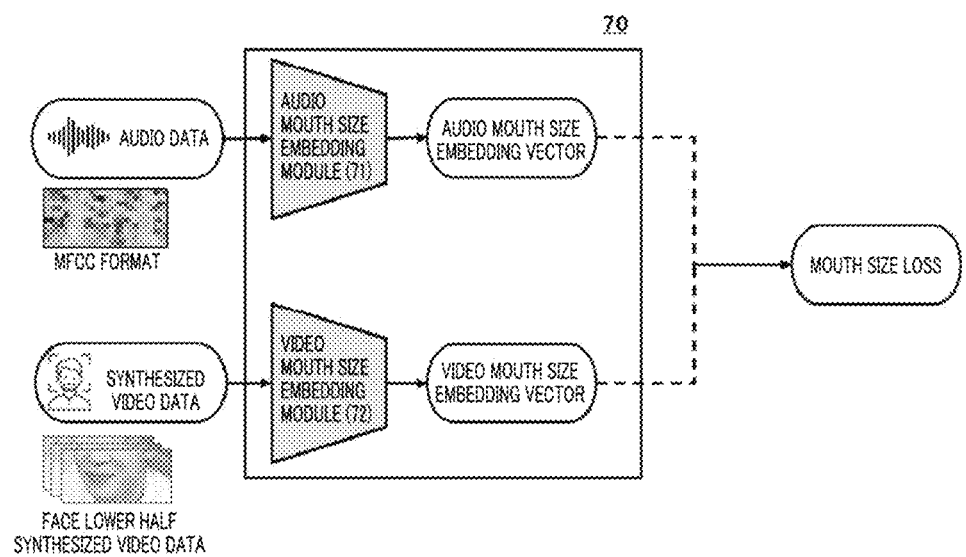
FIG. 13 is a schematic diagram illustrating the mouth size discriminator 70 according to the modified example of the present invention.

With respect to a mouth size discriminator 70, FIG. 12 is a schematic diagram illustrating a mouth shape synthesis device 1 using an artificial neural network further including the mouth size discriminator 70 according to a modified example of the present invention. FIG. 13 is a schematic diagram illustrating the mouth size discriminator 70 according to the modified example of the present invention. As illustrated in FIGS. 12 and 13, the mouth shape synthesis device 1 using an artificial neural network according to the modified example of the present invention may further include the mouth size discriminator 70 and the mouth size loss.

The mouth size discriminator 70 may be configured to include an audio mouth size embedding module 71 and a video mouth size embedding module 72. The audio mouth size embedding module 71 may be configured of a pre-learned artificial neural network including a plurality of Convolution Layers that receive the audio data and output audio mouth size vectors from an Output Layer configured of activation functions such as sigmoid and ReLU. The video mouth size embedding module 72 may be configured of a pre-learned artificial neural network that receives the synthesized video data and outputs the video mouth size vector from an Output Layer configured of activation functions such as Sigmoid and ReLU. At this time, it may be configured such that the audio mouth size embedding vector extracted from a specific Fully Connected Layer before the Output Layer of the audio mouth size embedding module may be output, and the video mouth size embedding vector extracted from a specific Fully Connected Layer before the Output Layer of the video mouth size embedding module 72 may be output.

In the learning session of the mouth size discriminator 70, the learning session may be configured such that the learning data labeled for the mouth size is input to the mouth size discriminator 70, and the parameters of the audio mouth size embedding module 71 and the video mouth size embedding module 72 of the mouth size discriminator 70 are updated in a direction in which a sum of the audio mouth size loss configured of the difference between the audio mouth size vector and the actual Label in the Output Layer of the audio mouth size embedding module 71, the video mouth size loss configured of the difference between the video mouth size vector and the actual Label output from the Output Layer of the video mouth size embedding module 72, and the mouth size loss (the smaller a difference between a mouth size feature present in the audio data and a mouth size feature present in the synthesized video data, the lower the mouth size loss is) configured of a distance between the audio mouth size embedding vector and the video mouth size embedding vector is reduced. At this time, the audio mouth size embedding module 71 and the video mouth size embedding module 72 may include a plurality of Convolution layer, Pooling layer, and Fully connected layer. The audio mouth size embedding vector and the video mouth size embedding vector may mean a vector output from the specific Fully connected layer. The mouth size loss of the mouth size discriminator 70 may be configured of a Mean square loss, a Cross entropy loss, and the like.

With respect to an operational relationship of the mouth size discriminator 70, the operational relationship may be configured such that the audio data and the synthesized video data are input to the mouth size discriminator 70, the audio mouth size embedding vector and the video mouth size embedding vector are respectively output from the audio mouth size embedding module 71 and the video mouth size embedding module 72, and the mouth size loss is calculated based on the output audio mouth size embedding vector and video mouth size embedding vector. The calculated mouth size loss may be applied in the learning session to update the parameters of the original video encoder 10, the audio encoder 20, and the synthesized video decoder 30. That is, in the original video encoder 10, the audio encoder 20, and the synthesized video decoder 30 for each epoch, the learning session may be configured such that the parameters of the original video encoder 10, the audio encoder 20, and the synthesized video decoder 30 are updated in a direction in which a sum of the reconstruction loss calculated based on the synthesized video data and the original video data, the synthesized video loss in the pre-learned synthesized video discriminator 31, the sync loss calculated based on the synthesized video data and the audio data in the pre-learned sync discriminator 40, and the mouth size loss calculated based on the audio mouth size embedding vector and the video mouth size embedding vector in the pre-learned mouth size discriminator 70 is reduced.

Figure 14:
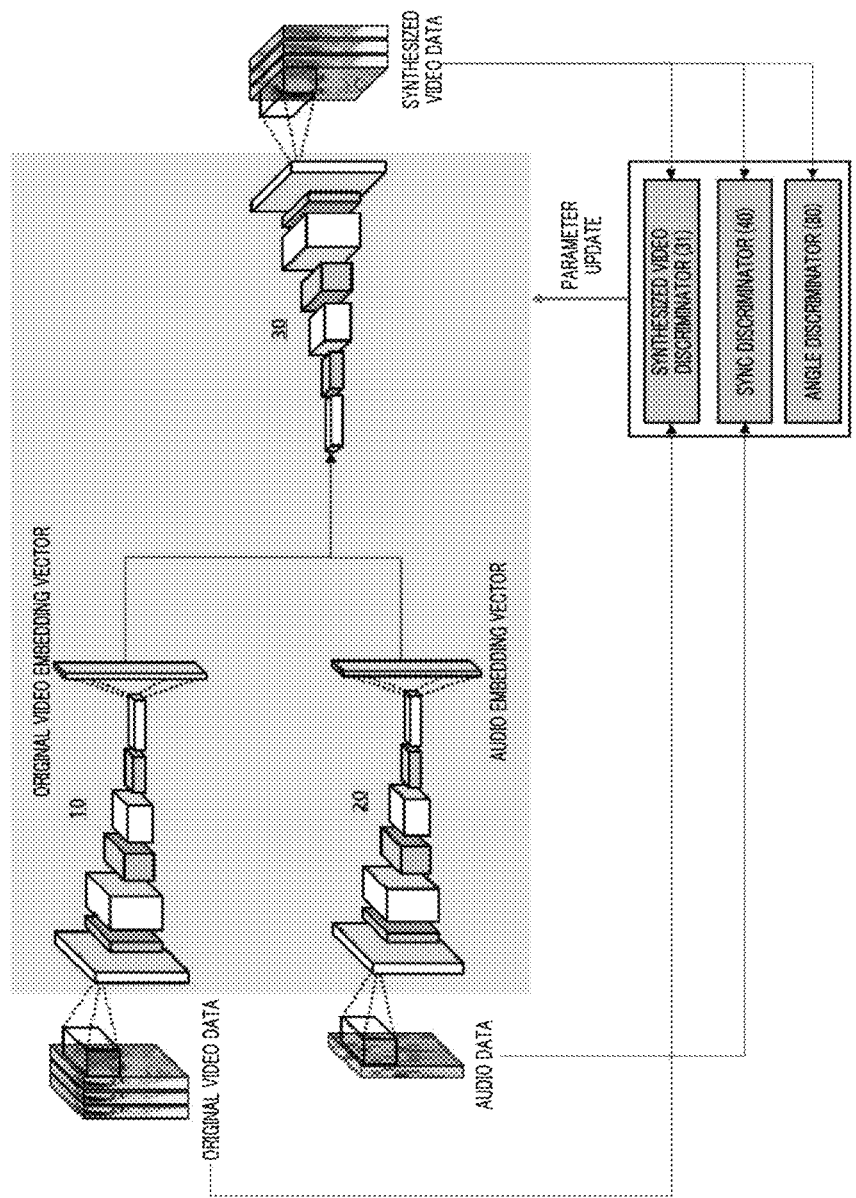
FIG. 14 is a schematic diagram illustrating a mouth shape synthesis device 1 using an artificial neural network further including an angle discriminator 80 according to a modified example of the present invention.
Figure 15:
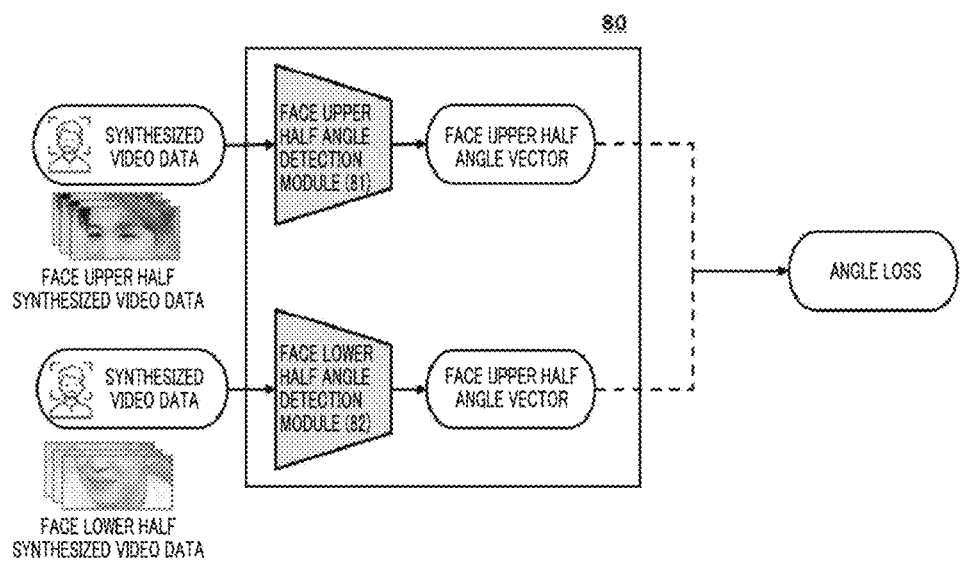
FIG. 15 is a schematic diagram illustrating the angle discriminator 80 according to the modified example of the present invention.

According to the mouth size discriminator 70 according to the modified example of the present invention, even for the same phoneme/syllable, an effect of allowing the synthesized video to be output with a different size of the mouth shape depending on the audio features (audio ringing in the mouth, audio that opens out of the mouth, quiet audio, loud audio, and the like) such as an amplitude or a waveform of the audio is generated. According to this, the simple synthesis of the mouth shape is not limited to the features of the phoneme/syllable, so that the mouth shape can be synthesized according to the situation, and an effect of strengthening the synthesized mouth size features is generated With respect to an angle discriminator 80, FIG. 14 is a schematic diagram illustrating a mouth shape synthesis device 1 using an artificial neural network further including the angle discriminator 80 according to a modified example of the present invention, and FIG. 15 is a schematic diagram illustrating the angle discriminator 80 according to the modified example of the present invention. As illustrated in FIGS. 14 and 15, the mouth shape synthesis device 1 using an artificial neural network according to the modified example of the present invention may further include the angle discriminator 80 and an angle loss.

The angle discriminator 80 may be configured to include a face upper half angle detection module 81 and a face lower half angle detection module 82. The face upper angle detection module 81 may be configured of a pre-learned artificial neural network including a plurality of Convolution Layers that receive an upper half video of a target face from the synthesized video data and output a face upper half angle vector from an Output Layer configured of activation functions such as Sigmoid and ReLU. The face lower half angle detection module 82 may be configured of a pre-learned artificial neural network that receives a lower half video of the target face from the synthesized video data and outputs a face lower half angle vector from an Output Layer configured of activation functions such as Sigmoid and ReLU. Generation of the upper half video and the lower half video of the target face from the synthesized video data may be performed by the face detection module 11.

In the learning session of the angle discriminator 80, the learning session may be configured such that the learning data labeled for the face angle (for example, a three-dimensional vector from a face center point in a chin direction) is input to the angle discriminator 80, and the parameters of the face upper half angle embedding module 81 and the face lower half angle embedding module 82 of the angle discriminator 80 are updated in a direction in which a sum of a face upper half angle loss configured of a difference between the face upper half angle vector output from the Output Layer of the face upper half angle embedding module 81 and the actual Label, a face lower half angle loss configured of a difference between the face lower half angle vector output from the Output Layer of the face lower half angle embedding module 82 and the actual Label, and an angle loss configured of a difference (for example, a cosine similarity) between the face upper half angle vector and the face lower half angle vector is reduced. The angle loss of the angle discriminator 80 may be configured of a Mean square loss, a Cross entropy loss, and the like to which the cosine similarity is applied.

With respect to an operational relationship of the angle discriminator 80, the operational relationship may be configured such that the synthesized video data is input to the angle discriminator 80, the face upper half angle vector and the face lower half angle vector are respectively output from the face upper half angle embedding module 81 and the face lower half angle embedding module 82, and the angle loss is calculated based on the output face upper half angle vector and face lower half angle vector. The angle loss calculated in this way may be applied in the learning session so that the parameters of the original video encoder 10, the audio encoder 20, and the synthesized video decoder 30 are updated. That is, in the original video encoder 10, the audio encoder 20, and the synthesized video decoder 30 for each epoch, the learning session may be configured such that the parameters of the original video encoder 10, the audio encoder 20, and the synthesized video decoder 30 are updated in a direction in which a sum of the reconstruction loss calculated based on the synthesized video data and the original video data, the synthesized video loss in the pre-learned synthesized video discriminator 31, the sync loss calculated based on the synthesized video data and audio data in the pre-learned sync discriminator 40, and the angle loss calculated based on the face upper half angle vector and the face lower half angle vector in the pre-learned angle discriminator 80 is reduced.

According to the angle discriminator 80 according to the modified example of the present invention, an effect of improving an angle alignment viewed by the upper and lower halves of the synthesized face and a perspective alignment (a sense of length in the upper half of the face and a sense of length in the lower half of the face) is generated. According to this, an effect of improving the alignment of the upper and lower halves of the face is generated compared to the conventional mouth shape synthesis artificial neural network that was awkwardly synthesized according to the angle of the face of the speaker in the original video.

Figure 16:
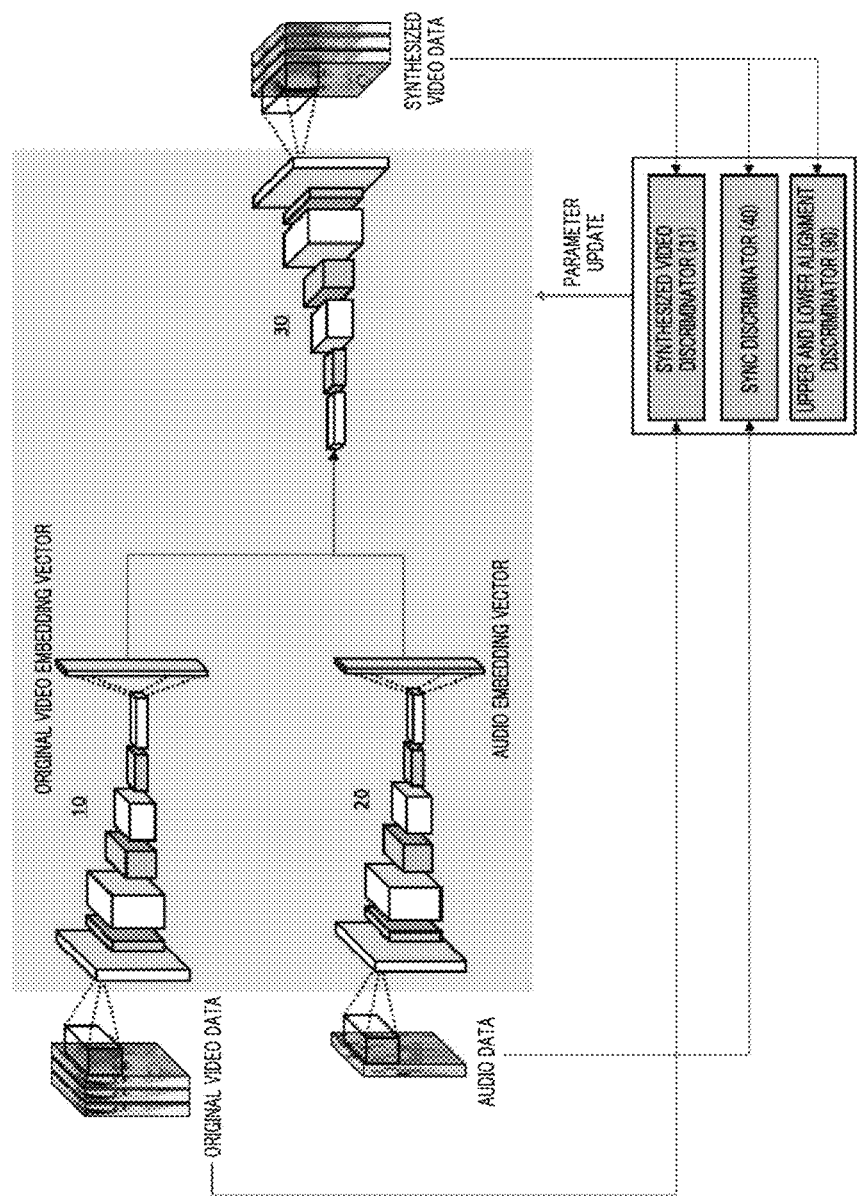
FIG. 16 is a schematic diagram illustrating a mouth shape synthesis device 1 using an artificial neural network further including an upper and lower alignment discriminator 90 according to a modified example of the present invention.
Figure 17:
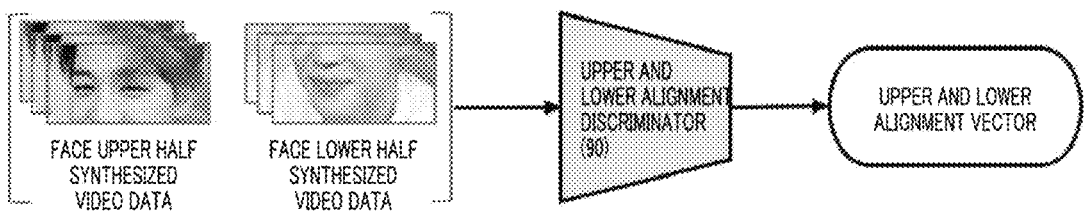
FIG. 17 is a schematic diagram illustrating the upper and lower alignment discriminator 90 according to the modified example of the present invention.

With respect to an upper and lower alignment discriminator 90, FIG. 16 is a schematic diagram illustrating a mouth shape synthesis device 1 using an artificial neural network further including the upper and lower alignment discriminator 90 according to a modified example of the present invention and FIG. is a schematic diagram illustrating the upper and lower alignment discriminator 90 according to the modified example of the present invention. As illustrated in FIGS. 16 and 17, the mouth shape synthesis device 1 using an artificial neural network according to the modified example of the present invention may further include the upper and lower alignment discriminator 90 and an upper and lower alignment loss.

The upper and lower alignment discriminator 90 is a pre-learned artificial neural network module including a plurality of Convolution Layers that embed the upper half face video and the lower half face video of the synthesized video data to be received as input data, and output upper and lower alignment vectors (probability values between 0 and 1) as output data, which are indicators of how well the visual features (facial expression, color, influence of lighting, and the like) of the upper and lower halves of the face in the Output Layer configured of the activation functions such as Sigmoid and ReLU are aligned. The generation of the upper half video and the generation of the lower half video of the target face from the synthesized video data may be performed by the face detection module 11.

Figure 18:
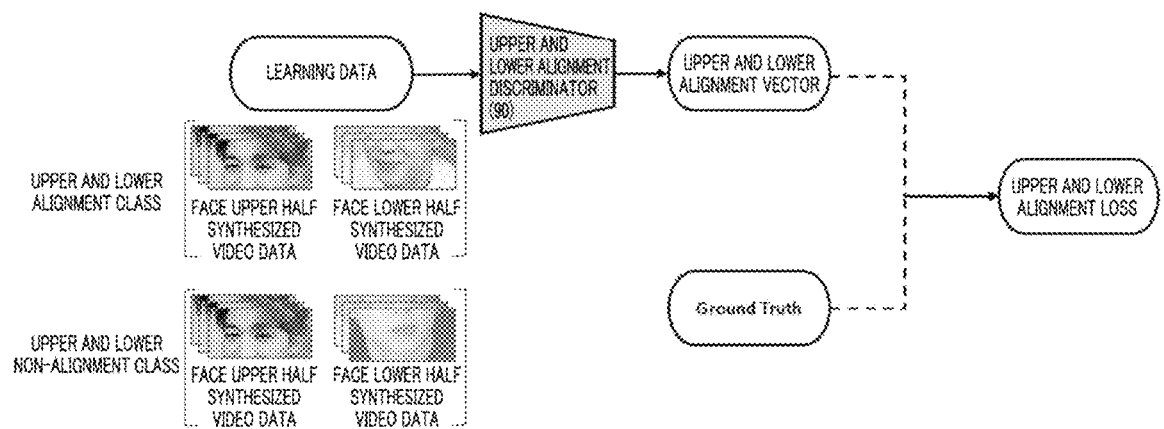
FIG. 18 is a schematic diagram illustrating the learning session of the upper and lower alignment discriminator 90 according to the modified example of the present invention.

With respect to the learning session of the upper and lower alignment discriminator 90, FIG. 18 is a schematic diagram illustrating the learning session of the upper and lower alignment discriminator 90 according to the modified example of the present invention. As illustrated in FIG. 18, in the learning session of the upper and lower alignment discriminator 90, the learning session may be configured such that [face upper half video and face lower half video] labeled with the upper and lower alignment and [face upper half video and face lower half video] labeled with the up and down non-alignment are input to the learning data, and the parameters of the upper and lower alignment discriminator 90 are updated in a direction in which the upper and lower alignment loss configured of a difference between the upper and lower alignment vector output from the Output Layer of the upper and lower alignment discriminator 90 and the actual label is reduced. The upper and lower alignment loss of the upper and lower alignment discriminator 90 may be configured of a Mean square loss, a Cross entropy loss, and the like.

With respect to the operational relationship of the upper and lower registration discriminator 90, the face upper half video and the face lower half video of the synthesized video data are embedded in the upper and lower alignment discriminator 90 to be received as input data, and the upper and lower registration vectors are output as output data. The output upper and lower alignment vector may be applied in the learning session so that the parameters of the original video encoder 10, the audio encoder 20, and the synthesized video decoder 30 are updated. That is, in the original video encoder 10, the audio encoder 20, and the synthesized video decoder 30 for each epoch, learning session may be configured such that the parameters of the original video encoder 10, the audio encoder 20, and the synthesized video decoder 30 are updated in a direction in which a sum of the reconstruction loss calculated based on the synthesized video data and the original video data, the synthesized video loss in the pre-learned synthesized video discriminator 31, the sync loss calculated based on the synthesized video data and the audio data in the pre-learned sync discriminator 40, and the top and bottom alignment vectors output from the pre-learned top and bottom alignment discriminator 90 is reduced.

According to the upper and lower alignment discriminator 90 according to the modified example of the present invention, the effect of harmoniously synthesizing visual features such as facial expression, color, and influence of lighting of the upper and lower halves of the synthesized face is generated. According to this, an effect of improving the visual alignment such as facial expression, color, and influence of lighting of the upper and lower halves of the face is generated compared to the conventional mouth shape synthesis artificial neural network that was awkwardly synthesized despite the mouth shape of the facial expression of the speaker.

Figure 19:
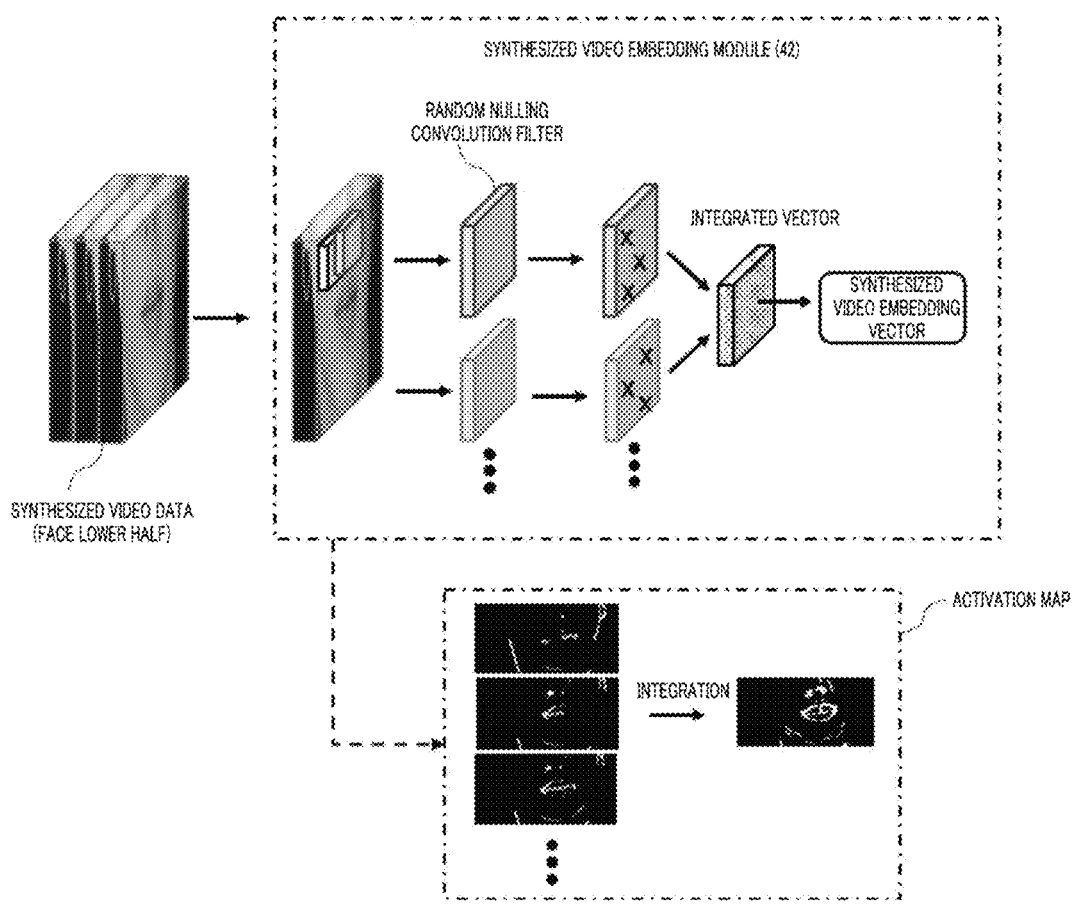
FIGS. 19 and 20 are schematic diagrams illustrating a synthesized video embedding module 42 to which random nulling of a convolution filter according to a modified example of the present invention is applied.
Figure 20:
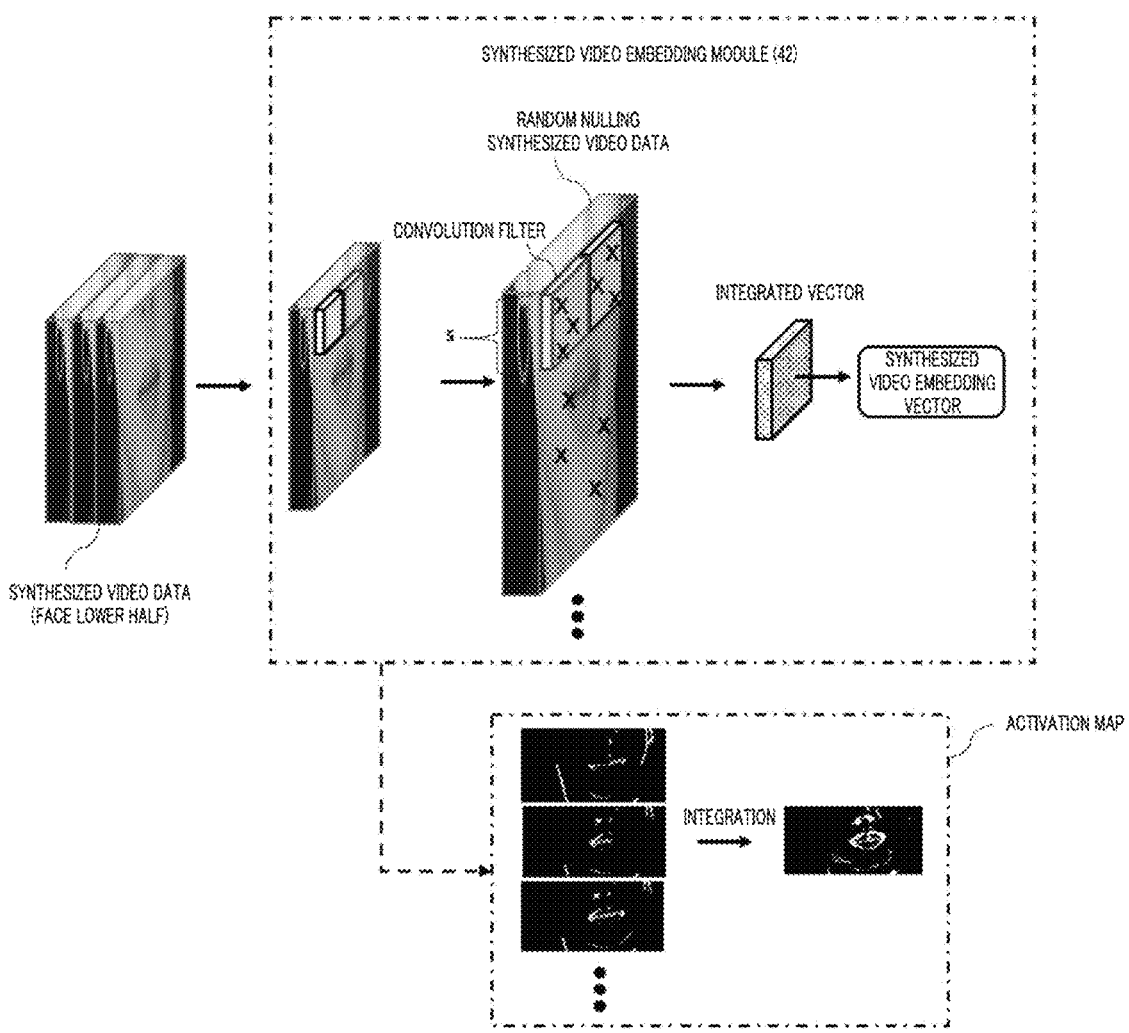

With respect to random nulling of a convolutional filter, FIGS. 19 and 20 are schematic diagrams illustrating a synthesized video embedding module 42 to which the random nulling of the convolutional filter according to a modified example of the present invention is applied. As illustrated in FIGS. 19 and 20, the mouth shape synthesis device 1 using an artificial neural network according to the modified example of the present invention may randomly apply nulling to a part of the convolution filter or a part of the input vector (audio data/synthesized video data) of the audio embedding module 41 and/or the synthesized video embedding module 42 of the sync discriminator 40 to output the output vector, and then repeat this step to output a plurality of audio sync vectors/synthesized video sync vectors to which different random nulling convolution filters are respectively applied, and be configured of an integrated vector obtained by integrating the plurality of output vectors as an audio embedding vector/synthesized video embedding vector.

With respect to a specific nulling method, the method may be configured such that nulling is randomly applied to a part of the Convolution Filter of the audio embedding module 41 and/or the synthesized video embedding module 42 in a method of randomly selecting a feature in the convolution filter whenever a sliding window is processed with the stride of the convolution filter which is set to 1 (random nulling convolution filter). The nulling is randomly applied to a part of the Convolution Filter of the audio embedding module 41 and/or the synthesized video embedding module 42 to output the output vector, this step is repeated to output a plurality of output vectors, and then an integrated vector that integrates the plurality of output vectors may be configured as the audio embedding vector and/or the synthesized video embedding vector. According to this, an Activation map is formed for the overall features of the audio, and an Activation map is formed for the overall features of the mouth shape in the synthesized video, so that an effect of improving the accuracy of the sync discriminator 40 is generated. As illustrated in FIG. 19, the activation map by each random nulling convolution filter does not capture the mouth shape features as a whole, but if the activation map is integrated by the random nulling convolution filter, it is possible to check that the mouth shape features are secured as a whole.

Alternatively, the method may be configured such that nulling is randomly applied to a part of the input vector (audio data and synthesized video data) (random nulling audio data and random nulling synthesized video data). According to this, compared to a case in which nulling is randomly applied to the convolution filter, the convolution is performed after applying the nulling to the input vector itself, so that the Random Feature Selection can be performed relatively quickly, thereby an effect of reducing computing resources is generated. In a case in which the nulling is randomly applied to the convolution filter, the sliding window should be performed by using a plurality of convolutional filters to which the nulling is randomly applied. There is a disadvantage that it is difficult to implement such a method in a general deep learning framework (for example, PyTorch, TensorFlow, or the like). As illustrated in FIG. 20, it can be check that the activation map by each random nulling convolution filter does not capture the mouth shape features as a whole, but if the activation map by the random nulling input vector is integrated, the mouth shape features are ensured well as a whole.

With respect to the mouth shape synthesis method using an artificial neural network, the mouth shape synthesis method (inference session) using an artificial neural network according to an embodiment of the present invention may include an original video encoding step, an audio encoding step, and a synthesized video decoding step.

The original video encoding step is a step in which the original video encoder 10 encodes the original video data, which is the target of the mouth shape synthesis, as a video including the synthesis target face, and outputs the original video embedding vector.

The audio encoding step is a step in which the audio encoder 20 encodes the audio data that is a basis for mouth shape synthesis and outputs the audio embedding vector.

The synthesized video decoding step is a step in which the synthesized video decoder 30 uses the original video embedding vector and the audio embedding vector as the input data, and outputs the synthesized video data in which the mouth shape corresponding to the audio data is synthesized on the synthesis target face.

Figure 21:
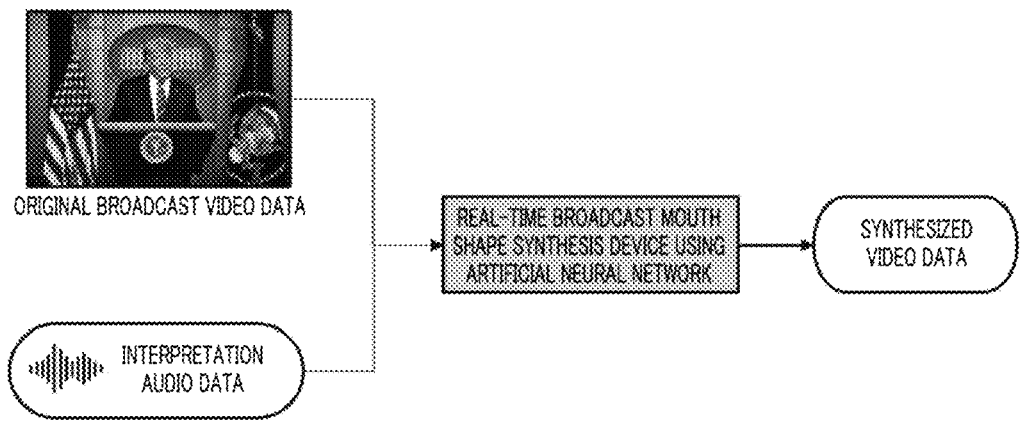
FIG. 21 is a schematic diagram illustrating a real-time broadcast mouth shape synthesis device using an artificial neural network according to an embodiment of the present invention.

Real-Time Broadcast Mouth Shape Synthesis Device Using Artificial Neural Network With respect to a real-time broadcast mouth shape synthesis device using an artificial neural network corresponding to an embodiment of the mouth shape synthesis device using an artificial neural network according to an embodiment of the present invention, FIG. 21 is a schematic diagram illustrating the real-time broadcast mouth shape synthesis device using an artificial neural network according to an embodiment of the present invention. As illustrated in FIG. 21, the real-time broadcast mouth shape synthesis device using an artificial neural network configured of the mouth shape synthesis device using an artificial neural network according to an embodiment of the present invention is a device for transmitting a broadcast video such as a press conference or an interview in real time in another language. The real-time broadcast mouth shape synthesis device may be configured such that the original broadcast video data (corresponding to the original video data) such as the press conference or the interview is used as the input data, and the interpretation audio data (corresponding to the audio data) generated in real time by an interpreter or an interpretation module are used as input data, and the synthesized video data synthesized into the mouth shape corresponding to the interpretation audio data in the original broadcast video data is used as the output data.

Dubbing Movie Mouth Shape Synthesis Device Using Artificial Neural Network

Figure 22:
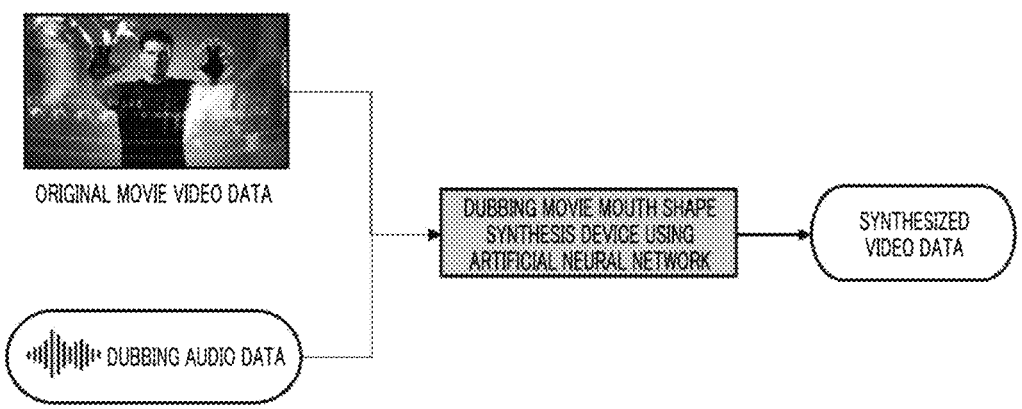
FIG. 22 is a schematic diagram illustrating a dubbing movie mouth shape synthesis device using an artificial neural network according to an embodiment of the present invention.

With respect to a dubbing movie mouth shape synthesis device using an artificial neural network corresponding to an embodiment of the mouth shape synthesis device using an artificial neural network according to an embodiment of the present invention, FIG. 22 is a schematic diagram illustrating the dubbing movie mouth shape synthesis device using an artificial neural network according to an embodiment of the present invention. As illustrated in FIG. 22, the dubbing movie mouth shape synthesis device using an artificial neural network configured of the mouth shape synthesis device using an artificial neural network according to an embodiment of the present invention relates to a device that synthesizes a dubbing audio and a mouth shape of a movie speaker to be matched to increase the realism of the dubbing movie. The mouth shape synthesis device may be configured such that original movie video data (corresponding to the original video data) and dubbing audio data (corresponding to the audio data) generated by a dubbing artist or a TTS module are used as the input data, and synthesized video data that is synthesized into the mouth shape corresponding to the dubbing audio data in the original movie video data is used as output data.

Online Lecture Localization Device Using Artificial Neural Network

Figure 23:
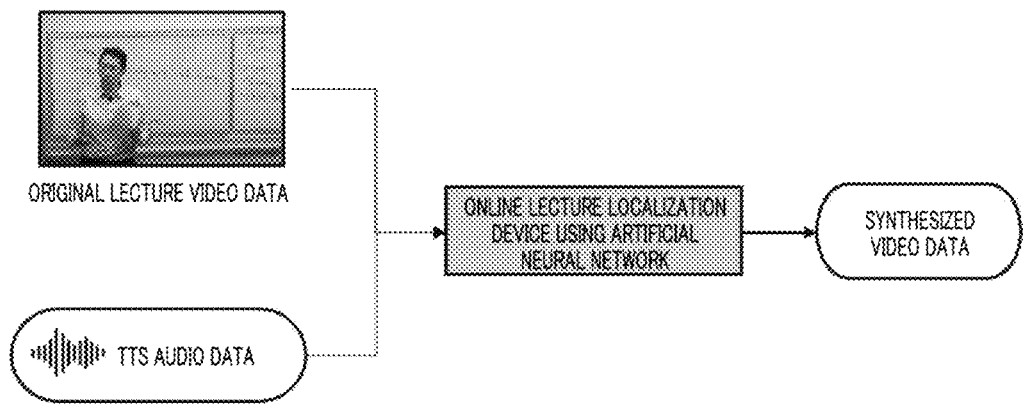
FIG. 23 is a schematic diagram illustrating an online lecture localization device using an artificial neural network according to an embodiment of the present invention.

With respect to an online lecture localization device using an artificial neural network corresponding to an embodiment of the mouth shape synthesis device using an artificial neural network according to an embodiment of the present invention, FIG. 23 is a schematic diagram illustrating the online lecture localization device using an artificial neural network according to an embodiment of the present invention. As illustrated in FIG. 23, the online lecture localization device using an artificial neural network configured of the mouth shape synthesis device using an artificial neural network according to an embodiment of the present invention is a device for synthesizing the online lecture filmed in a specific language into the audio and the mouth shape of another language. The online lecture localization device may be configured such that the original lecture video data (corresponding to the original video data) such as the online lecture, and TTS audio data (corresponding to the audio data) generated by the TTS module as an audio in a different language from the original lecture video data are used as the input data, and synthesized video data synthesized into the mouth shape corresponding to the TTS audio data in the original lecture video data is used as the output data.

Figure 24:
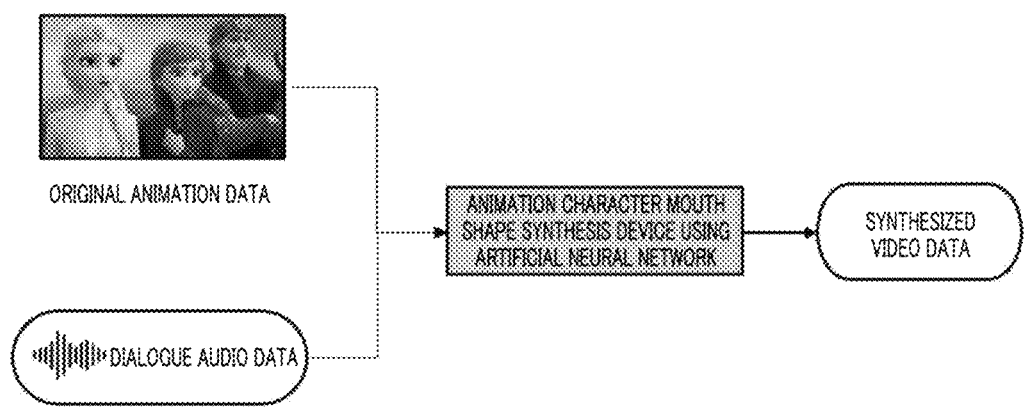
FIG. 24 is a schematic diagram illustrating an animation character mouth shape synthesis device using an artificial neural network according to an embodiment of the present invention.

Animation Character Mouth Shape Synthesis Device Using Artificial Neural Network With respect to an animation character mouth shape synthesis device using an artificial neural network correspond to an embodiment of the mouth shape synthesis device using an artificial neural network according to an embodiment of the present invention, FIG. 24 is a schematic diagram illustrating the animation character mouth shape synthesis device using an artificial neural network according to an embodiment of the present invention. As illustrated in FIG. 24, the animation character mouth shape synthesis device using an artificial neural network configured of the mouth shape synthesis device using an artificial neural network according to an embodiment of the present invention is a device for synchronizing the mouth shape and audio of the animation character as much as possible to reduce the animation CG cost as much as possible. The animation character mouth shape synthesis device may be configured such that original animation data (corresponding to the original video data), which is the original animation, and dialogue audio data (corresponding to the audio data) of a script corresponding to the frame of the original animation data are used as the input data, and synthesized video data synthesized into the mouth shape corresponding to the dialogue audio data in the original animation data is used as the output data.

Figure 25:
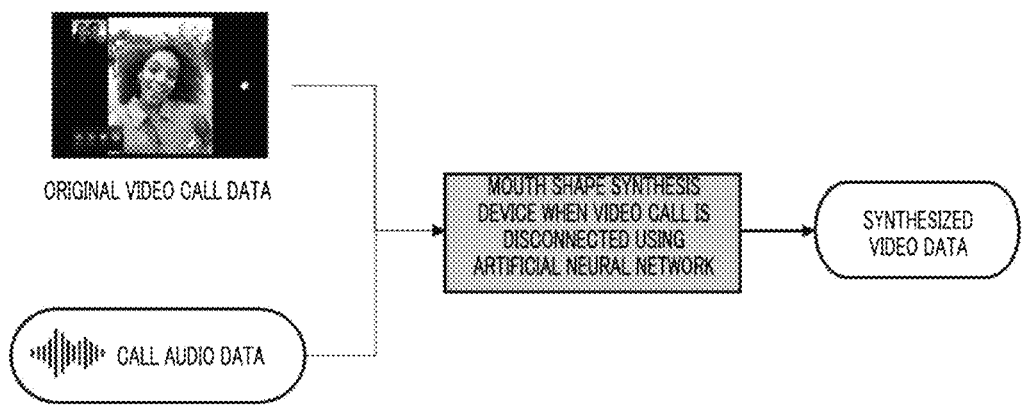
FIG. 25 is a schematic diagram illustrating a mouth shape synthesis device when the video call is disconnected using an artificial neural network according to an embodiment of the present invention.

Mouth Shape Synthesis Device when Video Call is Disconnected Using Artificial Neural Network With respect to the mouth shape synthesis device when a video call is disconnected using an artificial neural network corresponding to an embodiment of the mouth shape synthesis device using an artificial neural network according to an embodiment of the present invention, FIG. 25 is a schematic diagram illustrating the mouth shape synthesis device when the video call is disconnected using an artificial neural network according to an embodiment of the present invention. As illustrated in FIG. 25, the mouth shape synthesis device when the video call is disconnected using an artificial neural network configured of the mouth shape synthesis device using an artificial neural network according to an embodiment of the present invention is a device for creating a seamless video call user experience by generating a video of the video call in real time only with the call audio when the call video is disconnected. The mouth shape synthesis device may be configured such that original video call data (corresponding to the original video data) such as Facetime of Apple Co. and Voicetalk of Kakao Co., and call audio data (corresponding to the audio data) generated in real time by a video call counterpart are used as the input data, and synthesized video data synthesized into the mouth shape corresponding to the call audio data in the original video call data is used as the output data.

Figure 26:
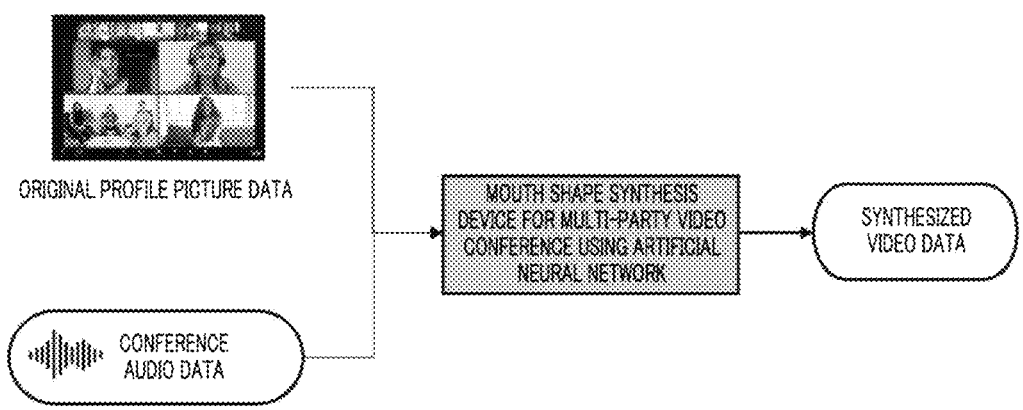
FIG. 26 is a schematic diagram illustrating a mouth shape synthesis device for a multi-party video conference using an artificial neural network according to an embodiment of the present invention.

Mouth Shape Synthesis Device for Multi-Party Video Conference Using Artificial Neural Network With respect to a mouth shape synthesis device for a multi-party video conference using an artificial neural network corresponding to an embodiment of the mouth shape synthesis device using an artificial neural network according to an embodiment of the present invention, FIG. 26 is a schematic diagram illustrating the mouth shape synthesis device for the multi-party video conference using an artificial neural network according to an embodiment of the present invention. As illustrated in FIG. 26, the mouth shape synthesis device for the multi-party video conference using an artificial neural network configured of the mouth shape synthesis device using an artificial neural network according to an embodiment of the present invention is a device for generating a synthesized video in which the mouth shape is synthesized from a profile picture to conduct the video conference only with the profile pictures in the multi-party video conference. The mouth shape synthesis device may be configured such that original profile picture data (corresponding to the original video data) of a video conference platform and conference audio data (corresponding to the audio data) generated in real time by the speaker are used as the input data, and synthesized video data synthesized into the mouth shape corresponding to the conference audio data in the original profile picture data is used as the output data.

Game Character Mouth Shape Synthesis Device Using Artificial Neural Network

Figure 27:
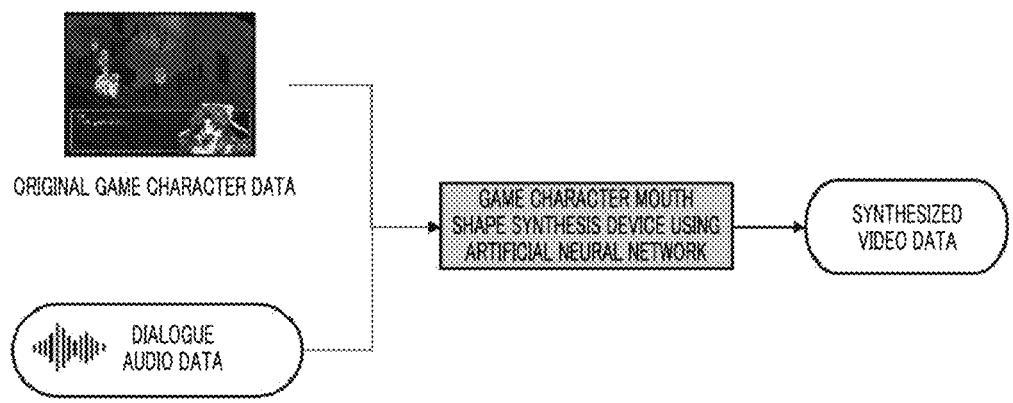
FIG. 27 is a schematic diagram illustrating the game character mouth shape synthesis device using an artificial neural network according to an embodiment of the present invention.

With respect to a game character mouth shape synthesis device using an artificial neural network corresponding to an embodiment of the mouth shape synthesis device using an artificial neural network according to an embodiment of the present invention, FIG. 27 is a schematic diagram illustrating the game character mouth shape synthesis device using an artificial neural network according to an embodiment of the present invention. As illustrated in FIG. 27, the game character mouth shape synthesis device using an artificial neural network configured of the mouth shape synthesis device using an artificial neural network according to an embodiment of the present invention is a device for generating the face of a game character in which the mouth shape corresponding to the dialogue is synthesized at a point where the dialogue of a specific character is performed in various game contents such as an adventure game, an arcade game, a sports game, an MMORPG, a role-playing game, a simulation game, and a puzzle game. The game character mouth shape synthesis device may be configured such that original game character data (corresponding to original video data) and dialogue audio data (corresponding to audio data) generated by the dubbing artist or the TTS module are used as the input data, and synthesized video data synthesized into the mouth shape correspond to the dialogue audio data in the original game character data.

Music Video Localization Device Using Artificial Neural Network

Figure 28:
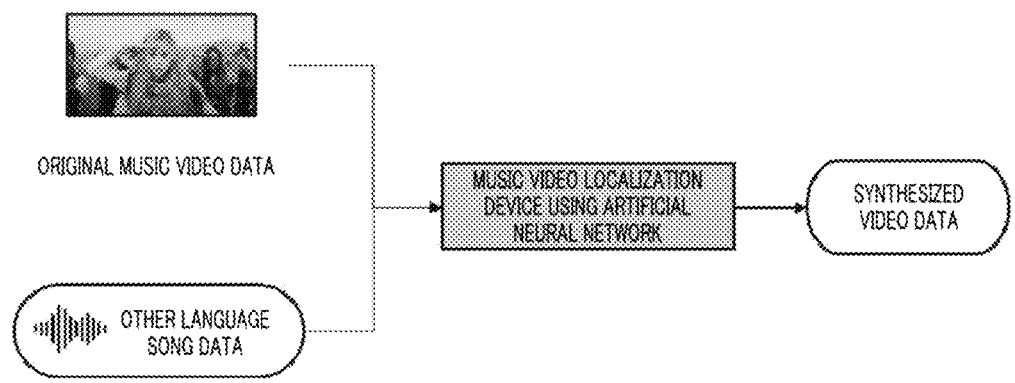
FIG. 28 is a schematic diagram illustrating a music video localization device using an artificial neural network according to an embodiment of the present invention.

With respect to a music video localization device using an artificial neural network corresponding to an embodiment of the mouth shape synthesis device using an artificial neural network according to an embodiment of the present invention, FIG. 28 is a schematic diagram illustrating the music video localization device using an artificial neural network according to an embodiment of the present invention. As illustrated in FIG. 28, the music video localization device using an artificial neural network configured of the mouth shape synthesis device using an artificial neural network according to an embodiment of the present invention is a device for synthesizing a music video filmed in a specific language into a song and a mouth shape in another language. The music video localization device may be configured such that original music video data (corresponding to the original video data) and other language song data (corresponding to audio data) generated by a singer are used as the input data, and synthesized video data synthesized into a mouth shape corresponding to the other language song data is used as the output data.

Politician Publicity Video Synthesis Device Using Artificial Neural Network

Figure 29:
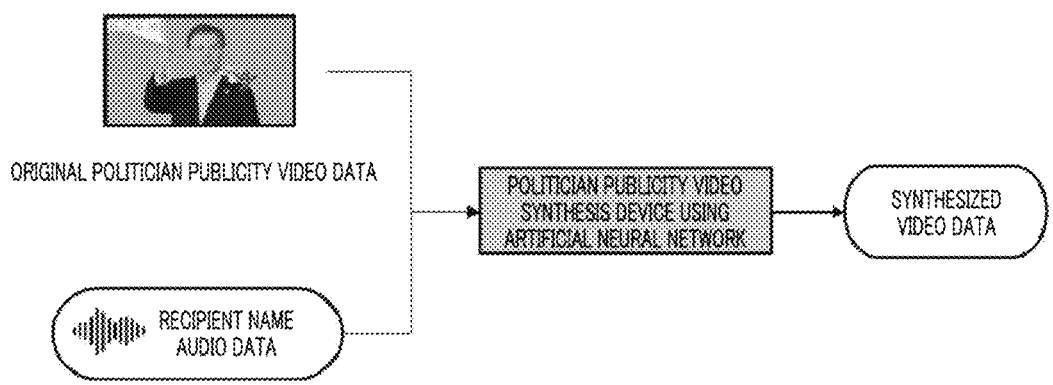
FIG. 29 is a schematic diagram illustrating a politician publicity video synthesis device using an artificial neural network according to an embodiment of the present invention.

With respect to a politician publicity video synthesis device using an artificial neural network corresponding to an embodiment of the video synthesis device using an artificial neural network according to an embodiment of the present invention, FIG. 29 is a schematic diagram illustrating the politician publicity video synthesis device using an artificial neural network according to an embodiment of the present invention. As illustrated in FIG. 29, the politician publicity video synthesis device using an artificial neural network according to an embodiment of the present invention is a device for generating a synthesized video such that a politician actually calls a name of a recipient. The politician publicity video synthesis device may be configured such that original politician publicity video data (corresponding to the original video data) and recipient name audio data (corresponding to the audio data) generated by inputting the name of the recipient into the TTS module may be used as the input data, and synthesized video data synthesized into a mouth shape corresponding to the recipient name audio data in the original politician publicity video data is used as the output data.

User-Customized Advertisement Output Device Using Artificial Neural Network

Figure 30:
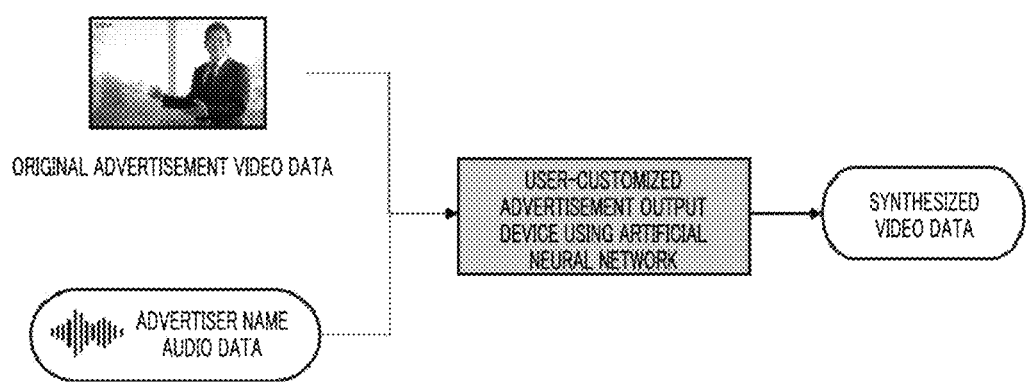
FIG. 30 is a schematic diagram illustrating a user-customized advertisement output device using an artificial neural network according to an embodiment of the present invention.

With respect to a user-customized advertisement output device using an artificial neural network corresponding to an embodiment of the mouth shape synthesis device using an artificial neural network according to an embodiment of the present invention, FIG. 30 is a schematic diagram illustrating the user-customized advertisement output device using an artificial neural network according to an embodiment of the present invention. As illustrated in FIG. 30, the user-customized advertisement output device using an artificial neural network configured of the mouth shape synthesis device using an artificial neural network according to an embodiment of the present invention is a device for generating a synthesized video in which an advertiser name is actually called in the advertisement video. The user-customized advertisement output device may be configured such that original advertisement video data (corresponding to the original video data) that is an advertisement video of a specific brand and advertiser name audio data (corresponding to the audio data) generated by inputting the advertiser name to the TTS module are used as the input data, and synthesized video data synthesized into a mouth shape corresponding to the advertiser name audio data in the original advertisement video data is used as the output data.

As described above, those skilled in the art to which the present invention pertains will be able to understand that the present invention may be embodied in other specific forms without changing the technical spirit or essential features thereof. Therefore, the above-described embodiments are to be understood in all respects as illustrative and not restrictive. The scope of the present invention is indicated by the following claims rather than the detailed description, and all changes or modified examples derived from the meaning and scope of the claims and equivalent concepts should be construed as being included in the scope of the present invention.

The features and advantages described herein are not all inclusive, and many additional features and advantages will become apparent to those skilled in the art, particularly upon consideration of the drawings, specification, and claims. Moreover, it should be noted that the language used herein has been primarily selected for readability and teaching purposes, and may not be selected to delineate or limit the subject matter of the present invention.

The foregoing description of embodiments of the present invention has been presented for purposes of illustration. It is not intended to be exhaustive or to limit the invention to the precise form disclosed. Those skilled in the art will appreciate that many modified examples and variations are possible in light of the above disclosure.

Therefore, the scope of the present invention is not limited by the detailed description, but by any claims of the application based thereon. Accordingly, the disclosure of the embodiments of the present invention is illustrative and not intended to limit the scope of the present invention as set forth in the following claims.

EXPLANATION OF SYMBOLS

1: mouth shape synthesis device using artificial neural network
10: original video encoder
11: face detection module
20: audio encoder
30: synthesized video decoder
31: synthesized video discriminator
40: sync discriminator
41: audio embedding module
42: synthesized video embedding module
50: face discriminator
60: emotion discriminator
70: mouth size discriminator
71: audio mouth size embedding module
72: video mouth size embedding module
80: angle discriminator
81: face upper half angle detection module
82: face lower half angle detection module
90: upper and lower alignment discriminator
100: user client
110: target face detection module
111: landmark detection module
112: landmark position correction module
113: target face lower half mask module
200: specific service web server

The invention claimed is:

1. A mouth shape synthesis device using artificial neural network, comprising:
an original video encoder that encodes original video data which is a target of a mouth shape synthesis as a video including a face of a synthesis target to output an original video embedding vector;
an audio encoder that encodes audio data that is a basis for the mouth shape synthesis and outputs an audio embedding vector;
a synthesized video decoder that uses the original video embedding vector and the audio embedding vector as input data, and outputs synthesized video data in which a mouth shape corresponding to the audio data is synthesized on the synthesis target face;

a synthesized video discriminator that is an artificial neural network module which uses the synthesized video data as input data and uses a synthesized video discrimination vector, which distinguishes whether the synthesized video data is generated from the synthesized video decoder as output data, and outputs a synthesized video loss configured based on the synthesized video discrimination vector;

an audio embedding module that is a pre-learned artificial neural network module which receives the audio data and outputs an audio sync vector;

a synthesized video embedding module that is a pre-learned artificial neural network module that which receives the synthesized video data and outputs a synthesized video sync vector; and a sync discriminator that outputs a sync loss configured of a difference between the audio sync vector and the synthesized video sync vector, wherein the audio embedding module and the synthesized video embedding module of the sync discriminator are pre-learned such that the higher a sync rate between the audio data and mouth shapes of the synthesized video data, the lower a sync loss is output, wherein the audio encoder is configured to output an emotion vector for distinguishing a plurality of emotion state classes together with the audio embedding vector as output data, wherein the synthesized video discriminator is configured to output the emotion vector together with the synthesized video discrimination vector as output data, and wherein in a learning session of the original video encoder, the audio encoder, and the synthesized video decoder, the learning session is configured to be updated in a direction in which a sum of a reconstruction loss configured of a difference between the synthesized video data and the original video data, the synthesized video loss, the sync loss, and an emotion loss configured of a difference between the emotion vector and the labeled emotion state class is reduced.

2. The mouth shape synthesis device using artificial neural network of claim 1, further comprising:

a face discriminator that is an artificial neural network module pre-trained to output a face discrimination vector for classifying a realistic face class when the synthesized video data is used as input data and a realistic face is included in the synthesized video data and an unrealistic face class when an unrealistic face is included in the synthesized video data, and outputs a face loss configured of a difference between the face discrimination vector and a labeled class;

wherein in the learning session of the original video encoder, the synthesized video decoder, and the synthesized video discriminator, the learning session is configured to be updated in a direction in which a sum of the reconstruction loss, the synthesized video loss, the sync loss, and the face loss is reduced.

3. The mouth shape synthesis device using artificial neural network of claim 1, further comprising:

an audio mouth size embedding module that is a pre-learned artificial neural network module which receives the audio data and outputs an audio mouth size embedding vector;

a video mouth size embedding module that is a pre-learned artificial neural network module that which receives the synthesized video data and outputs a video mouth size embedding vector; and a mouth size discriminator that outputs a mouth size loss configured of a difference between the audio mouth size embedding vector and the video mouth size embedding vector, wherein the audio mouth size embedding module and the video mouth size embedding module of the mouth size discriminator are pre-learned such that the closer a distance between a mouth size feature of the audio data and a mouth size feature of the synthesized video data, the lower the mouth size loss is output, wherein in the learning session of the original video encoder, the synthesized video decoder, and the synthesized video discriminator, the learning session is configured to be updated in a direction in which a sum of the reconstruction loss, the synthesized video loss, the sync loss, and the mouth size loss is reduced.

4. The mouth shape synthesis device using artificial neural network of claim 1, wherein the mouth shape synthesis device randomly apply nulling to a convolution filter to output a plurality of the audio sync vectors or the synthesized video sync vectors, and wherein the mouth shape synthesis device calculate the sync loss based on an integrated vector obtained by integrating the plurality of outputted the audio sync vectors or the synthesized video sync vectors.

5. A mouth shape synthesis device using artificial neural network, comprising:

an original video encoder that encodes original video data which is a target of a mouth shape synthesis as a video including a face of a synthesis target to output an original video embedding vector;

an audio encoder that encodes audio data that is a basis for the mouth shape synthesis and outputs an audio embedding vector; and a synthesized video decoder that uses the original video embedding vector and the audio embedding vector as input data, and outputs synthesized video data in which a mouth shape corresponding to the audio data is synthesized on the synthesis target face, wherein the audio encoder is configured to output an emotion vector for distinguishing a plurality of emotion state classes together with the audio embedding vector as output data, wherein in a learning session of the original video encoder, the audio encoder, and the synthesized video decoder, the learning session is configured to be updated in a direction in which a sum of a reconstruction loss configured of a difference between the synthesized video data and the original video data, the synthesized video loss, the sync loss, and an emotion loss configured of a difference between the emotion vector and the labeled emotion state class is reduced, wherein the synthesized video loss is a loss output from a synthesized video discriminator, which is an artificial neural network module, using the synthesized video data as input data and using a synthesized video discrimination vector, which distinguishes whether the synthesized video data is generated from the synthesized video decoder, as output data, and means a loss configured based on the synthesized video discrimination vector, wherein the sync loss is a loss output from a sync discriminator including an audio embedding module which is a pre-learned artificial neural network module that receives the audio data and outputs an audio sync vector; and a synthesized video embedding module which is a pre-learned artificial neural network module that receives the synthesized video data and outputs a synthesized video sync vector, and means a loss configured of a difference between the audio sync vector and the synthesized video sync vector, and wherein the audio embedding module and the synthesized video embedding module of the sync discriminator are pre-learned such that the higher a sync rate between the audio data and mouth shapes of the synthesized video data, the lower a sync loss is output.

6. A mouth shape synthesis method using the mouth shape synthesis device using an artificial neural network according to claim 1, the method comprising:

an original video encoding step in which an original video encoder encodes original video data, which is a target of mouth shape synthesis, as a video including a synthesis target face, and outputs an original video embedding vector;

an audio encoding step in which an audio encoder encodes audio data that is a basis for the mouth shape synthesis and outputs an audio embedding vector; and a synthesized video decoding step in which a synthesized video decoder uses the original video embedding vector and the audio embedding vector as input data, and outputs synthesized video data in which a mouth shape corresponding to the audio data is synthesized on the synthesized target face.

* * * * *